(12) United States Patent  
Wu et al.

(10) Patent No.: US 8,525,544 B2  
(45) Date of Patent: Sep. 3, 2013

(54) QUANTUM COMPUTING CIRCUITS

(75) Inventors: Cheng-Hsiao Wu, Rollo, MO (US); Casey Andrew Cain, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 13/602,753

(22) Filed: Sep. 4, 2012

(65) Prior Publication Data

US 2013/0057314 A1 Mar. 7, 2013

Related U.S. Application Data

(60) Provisional application No. 61/573,278, filed on Sep. 2, 2011.

(51) Int. Cl.  
*H03K 19/195* (2006.01)

(52) U.S. Cl.  
USPC .................................................. 326/5; 326/6

(58) Field of Classification Search  
USPC ............................................................ 326/1–7  
See application file for complete search history.

(56) References Cited

U.S. PATENT DOCUMENTS

| | | | |
|---|---|---|---|
| 2007/0170952 A1* | 7/2007 | Freedman et al. | 326/5 |
| 2008/0067561 A1* | 3/2008 | Bibilashvili et al. | 257/287 |
| 2008/0129328 A1* | 6/2008 | Freedman et al. | 326/6 |
| 2008/0224726 A1* | 9/2008 | Freedman et al. | 326/6 |

* cited by examiner

*Primary Examiner* — Jany Richardson  
(74) *Attorney, Agent, or Firm* — Brannon Sowers & Cracraft PC

(57) ABSTRACT

A system for performing digital operations, including a first device configured to transform a digital input into one or more signals, at least one AB ring, the at least one AB ring irreducibly-coupled and configured to include at least three terminals, a second device configured to read a portion of a signal expressed upon two or more of the at least three terminals, and a third device configured to transform the portion of the signal expressed upon two or more of the at least three terminals into a digital output, the third device operationally connected to the second device.

16 Claims, 26 Drawing Sheets

QUANTUM COMPUTING CIRCUITS

CROSS-REFERENCE TO RELATED APPLICATIONS

This application claims the benefit under 35 U.S.C. §119 (e) of U.S. Patent Application No. 61/573,278, entitled "QUANTUM COMPUTING CIRCUITS BASED UPON AHARONOV-BOHM EFFECT IN MESOSCOPIC RINGS," filed Sep. 2, 2011 which is incorporated herein by reference in its entirety.

BACKGROUND

The present invention relates to a circuit for executing a logic operation by a novel mechanism, or more particularly to a quantum circuit capable of performing digital processing and suitably used with an ultra-high density logic operation circuit.

Since the invention of a semiconductor integrated circuit initiated by the planer technique in 1959, the progress of the Si or GaAs LSI (Large Scale Integration) technique has been very conspicuous. The demand for faster and faster computing architectures has been met by improvements in the manufacturing processes allowing integrated circuits to be scaled to smaller and smaller dimensions. The decrease in size of the circuits has led to increasing switching speeds and increasing total processing power per unit of area. In effect, conventional architecture has generally improved device performance by reducing the size of devices.

However, in some instances (for example the case of an Si MOS memory of 64 megabit DRAM) while the memory cell size has been reduced to as small as 1 $\mu m^2$, further integration is troublesome due to the difficulty in wiring. Alternatively, high levels of integration have led to problems of heat generation and heat dissipation. For example, highly integrated Si bipolar ECL (Emitter Coupled Logic) circuits are seriously hampered by the problem of heat generation. Thus, the conventional architecture of highly integrated devices is facing a limit with respect to high integration.

In effect, the concept of improving performance through increasing integration seems to be reaching a practical limit for the typical implementations of circuits. As such, there is a need to provide a different circuit architecture that permits continued integration, efficient construction, and faster performance. The present novel technology addresses this need.

SUMMARY

This specification describes technologies relating to Quantum Network Theory (QNT) and circuits implementing digital processing making use of QNT. QNT presents a hybrid methodology between the spintronics approach, an approach based upon exploiting the intrinsic spin and magnetic moment of an electron in addition to its charge, and classical computing. QNT is based upon the Aharonov-Bohm effect, a quantum mechanical phenomenon in which an electrically charged particle is affected by an electromagnetic field (E, B), despite being confined to a region in which both the magnetic field B and electric field E are zero for a longitudinal direction of propagation of the electron. The underlying mechanism is explained as the coupling of the electromagnetic potentials with the complex phase of a charged particle's wavefunction. While this specification describes the invention utilizing an implementation using a magnetic effect, the invention is equally realizable using an electric effect in a constant potential.

As will be explained, the phase of an electron wave propagating along a section of a conducting ring's path can be modulated by a magnetic flux penetrating the loop. By analyzing and controlling this phase at the quantum level, logical operations can be performed and measured through external terminals attached to the ring. In some implementations, input bits are applied as magnetic fluxes and outputs are received as electric currents.

Such quantum networks can be scaled to devices at least as small as three atoms. For example, a simple logic circuit such as an inverter can be realized by such a sized quantum network. Such quantum networks can also perform logic operations in one step that would normally take many transistors staged together to accomplish. By combining many such quantum networks together, massive parallel computation can be achieved.

Theoretic Overview

For convenience, an Aharonov-Bohm (AB) ring can be thought of as a man-made atom. A clockwise (or counter-clockwise) circulation of a persistent current within a ring can also have an analogy with that of a spin-up (or spin-down) of spin-based (spintronics approach) electronics. The electron density in an isolated ring can be considered as uniform throughout the entire ring in a uniform positive background of ionic charge of a metal. The flux periodicity is thus an elementary flux quantum $\Phi_0=hc/e$. When two external terminals are connected to such an isolated AB ring, the electron transport from one terminal to the other exhibits several different classes of behavior in a strictly one-dimensional excitable model. This is similar to microwave propagation in a waveguide.

However, unlike the fundamental modes in microwave propagation that are classified by the waveguide's geometrical properties, in a two terminal AB ring as an electron waveguide, transmission behavior is classified by the total number of atoms, (or nodes) on the one-dimensional ring and the relative locations of the two terminals. Even-numbered and odd-numbered rings form two different classes of waveguide.

In particular, an odd-numbered AB ring with the distance between the two terminals, as measured from the upper and lower paths of the ring, differing by at least one atomic spacing results in a double flux periodicity ($\Phi_0/2$). Even-numbered rings have a single flux periodicity $\Phi_0$. As long as the electron coherence is maintained, larger one-dimensional AB rings behave similar to smaller AB rings because scaling laws preserve the transmission behavior when a ring size is scaled up an odd number of times.

Two or more AB rings interacting together by an added bound length, or path between the two rings, have an unchanged flux periodicity. This is a result of the property of reducible networks, such that each ring can be modulated by one flux only. In an irreducible network, when two AB rings are merged to form an interacting center common path (as shown in FIG. 1), there is a charge transfer from other locations of the ring to the center common path to form a bonding or anti-bonding orbital. The phase of an electron wave function on this center common path can be modulated by applied fluxes on either side of the center common path. Thus, bonding and anti-bonding behavior, or the charge transfer into or out of the center common path, can be manipulated by controlling the two applied fluxes. This space charge effect, or the capacitance effect, is not limited to a p-n junction from different semiconductor types. This pure semiconductor equilibrium charge transfer behavior may be seen in metal rings at nano or atomic scales. In turn, this indicates that the transport of electrons in electron waveguides is both resistive (elastic scattering at the nodes) and capacitive (because of the space charge capacitance), an effect similar to the electron transport through a classical diode.

Multi-terminal AB rings can be used for computing by employing the concept of two or three coherent inputs. Logic gates and full and half-adders can be constructed based on the vector sum of the two or three coherent inputs. Spintronics-based computing uses a concept where the spin-up (or spin-down) is associated with an AB ring having clockwise (or counter clockwise) circulation of the persistent current. As such, it is possible to construct four rules of a half adder using the four configurations of spin pairings (or the AB ring pairings), even though the coupling of spins and of AB rings are different. But note that in coupled AB rings, the entanglement is guaranteed as long as the coherence length is larger than the entire network.

This specification presents a novel technology where the quantum network model of the irreducible network for two coupled AB rings is utilized and viewed through a node-equation approach, enabling the construction of logic circuits through a novel and unconventional approach.

In general, one innovative aspect of the subject matter described herein may be embodied in methods that include the actions of transforming at least one digital input into a signal and using the signal to excite an irreducibly-coupled AB ring network, wherein the AB ring network is configured with three terminals; and then reading a state of the irreducibly-coupled AB ring network, the state read by evaluating what portion of a transmission probability can be measured on one or more of the three terminals. Other embodiments of this aspect include corresponding systems and apparatus configured to perform the actions of the methods.

These and other embodiments can each optionally include one or more of the following features. In some implementations, the signal can be in the form of a magnetic flux. In some implementations, the read state is transformed into an array of bits. Further, some implementations iteratively read the state, transform the state into a signal and then re-excite the AB ring network using that signal; the iterations continuing for a predetermined number of times. Additionally, some implementations read the state, transform the state into a signal and then excite a subsequent AB ring network.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
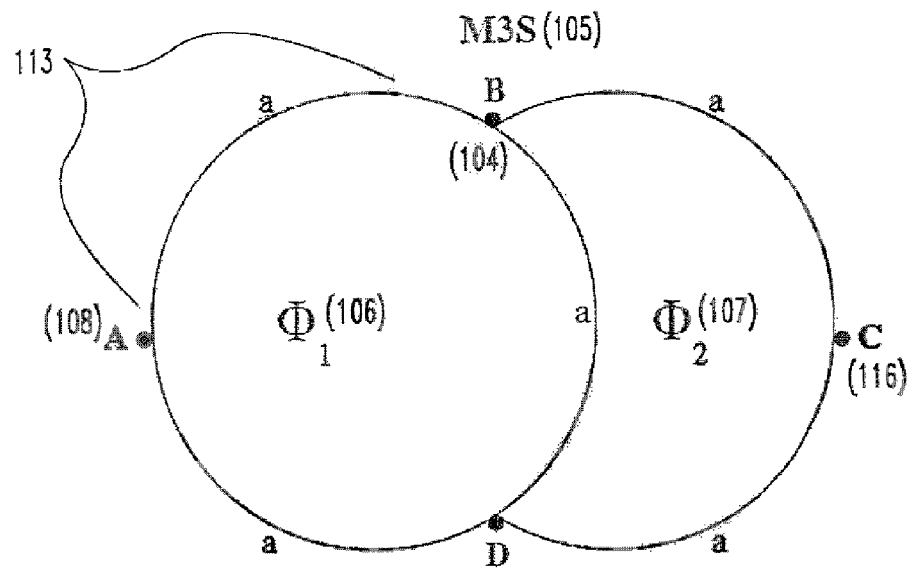
FIGS. 1A-1F are representations of six irreducibly-coupled AB ring network configurations.
Figure 1B:
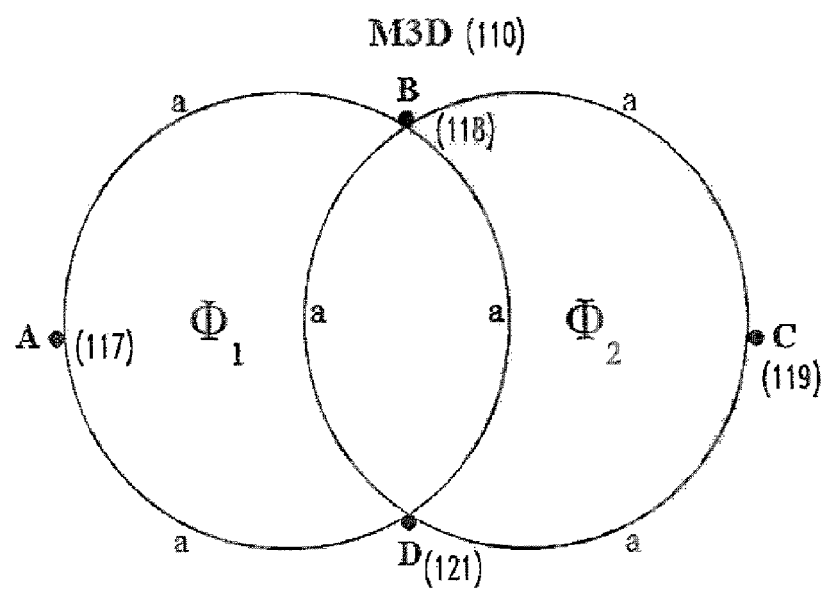
Figure 1C:
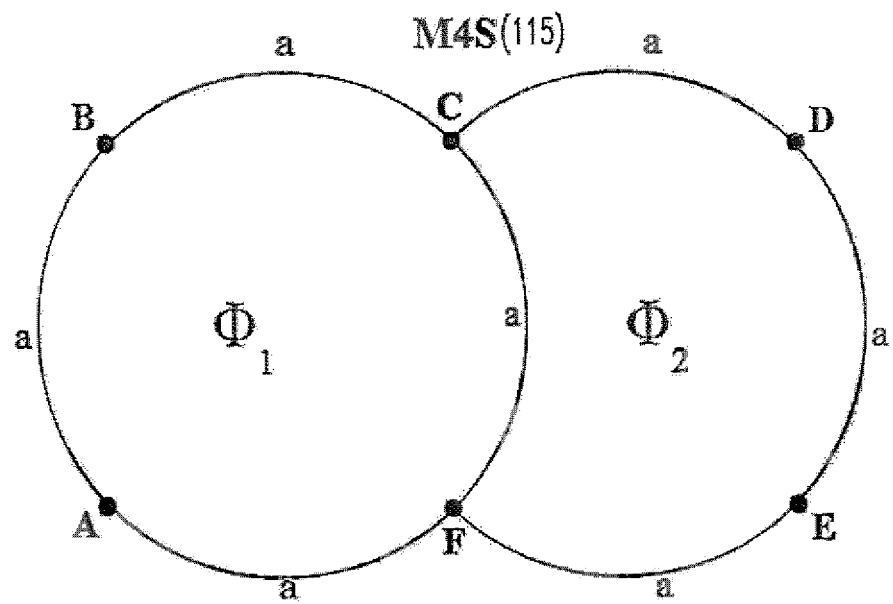
Figure 1D:
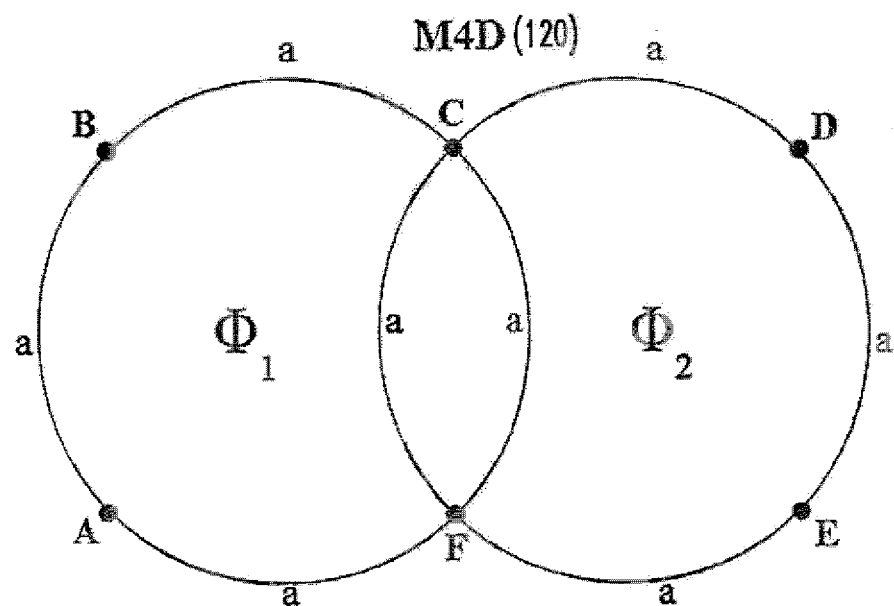
Figure 1E:
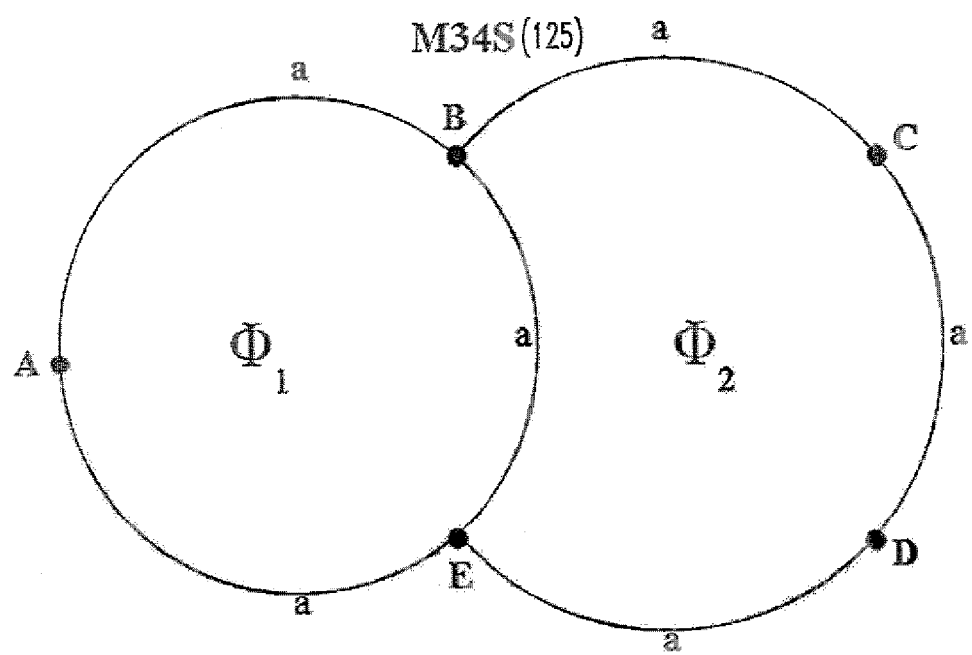
Figure 1F:
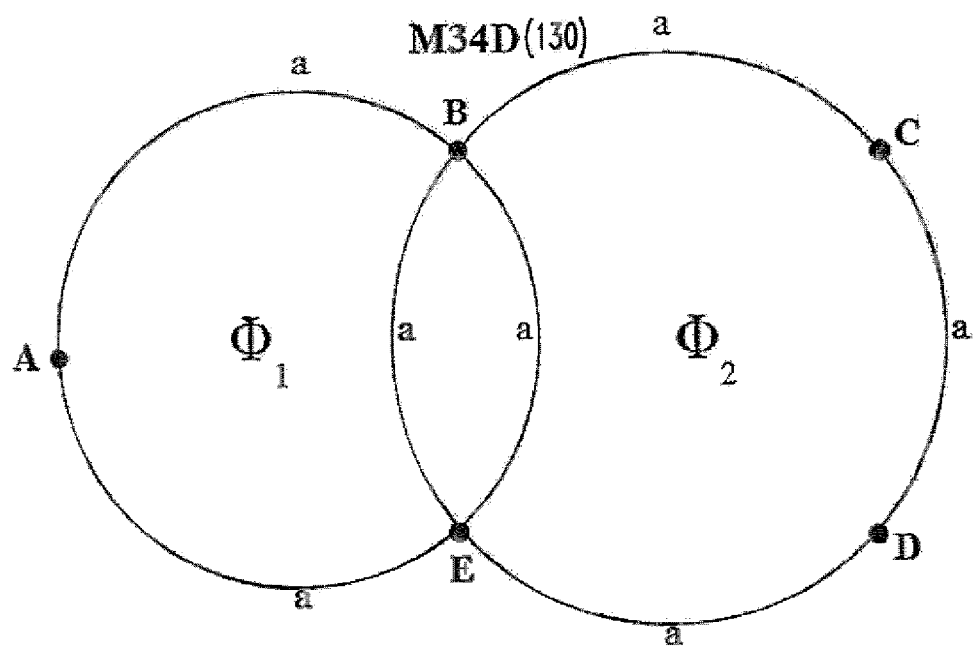

Before the present methods, implementations and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and "the" include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often, though not necessarily always, occur and that the description includes instances where said event or circumstance occurs as well as instances where it does not.

FIG. 1A-F are representations of six irreducibly-coupled AB ring network configurations, 105, 110, 115, 120, 125, 130. Such AB rings can be considered as rings of harmonic oscillators, where applied fluxes can further modulate the phase of the oscillators. The equivalence of this node equation approach with respect to traditional scattering matrix methodology is commonly understood in the art.

This collection of six irreducibly-coupled AB ring network configurations represent three different classes of irreducible AB rings with the classes being even-even, odd-odd, and even-odd combination. It is convenient to classify coupled AB ring networks, according to the variables a) whether each ring contains an even or odd number of atoms, and b) whether the coupling between them is characterized by a single or double-bond. AB ring network configurations 105, 115, 125 represent AB ring networks with a single bond structure while AB ring network configurations 110, 120, 130 represent AB ring networks with a double bond structure. Note that the AB ring networks may be modulated by two different fluxes, $\Phi_1$ 106 and $\Phi_2$ 107 resulting in a two-dimensional Brillouin zone and thus having a flux periodicity of a rational number.

The odd-odd AB ring network configurations, shown as AB ring networks 105 and 110, are labeled M3S (105) for a single bound and M3D (110) for the double bound situation. Dots on the circle denote locations of atoms (108, 109, 114, 116, 117, 118, 119, 121) with a spacing of a 113 to the nearest neighboring atom. For example, the atoms neighboring atom 108 are atoms 109 and 114, and are each a distance of "a" 113 from atom 103. Further, while drawn apart for purposes of clarity, note that in some implementations the two center paths of 110 are very closely spaced. For example, in some implementations the center path for a double bound case actually has twice the width with respect to the other paths or portions of the AB ring. Similarly, for some implementations the center path of ring 105 is distorted from its drawn representation. In accordance with the visual representation, both AB rings 105 and 110 of each have the same flux area.

The even-even AB ring network configurations are labeled M4S (115) for a single bound and M4D (120) for the double bound situation. Again, dots on the circle denote locations of atoms, with the atoms being a spaced distance of "a" 113 apart. For example, for some implementations in gold, the value of "a" is typically the separation distance of two gold atoms. Also as discussed above, in some implementations the two center paths of AB ring configuration 120 are very closely spaced and the center path of AB ring configuration 115 is distorted from its drawn representation. Additionally, in accordance with the visual representation, AB rings 115, 120 have the same flux area.

The odd-even AB ring network configurations 125, 130, are labeled M34S (125) for a single bound and M34D (130) for the double bound situation. Dots on the circle denote locations of atoms, with the atoms being a spaced distance of a 113 apart. As such, the Lattice spacing is atomic, which can vary upon the waveguide's material. Also as described above, in some implementations the two center paths of 125 are very closely spaced and the center path of network configuration 120 is distorted from its typical, as illustrated, geometry. As shown in FIG. 1, respective AB rings 125, 120 have differing flux areas.

Figure 2:
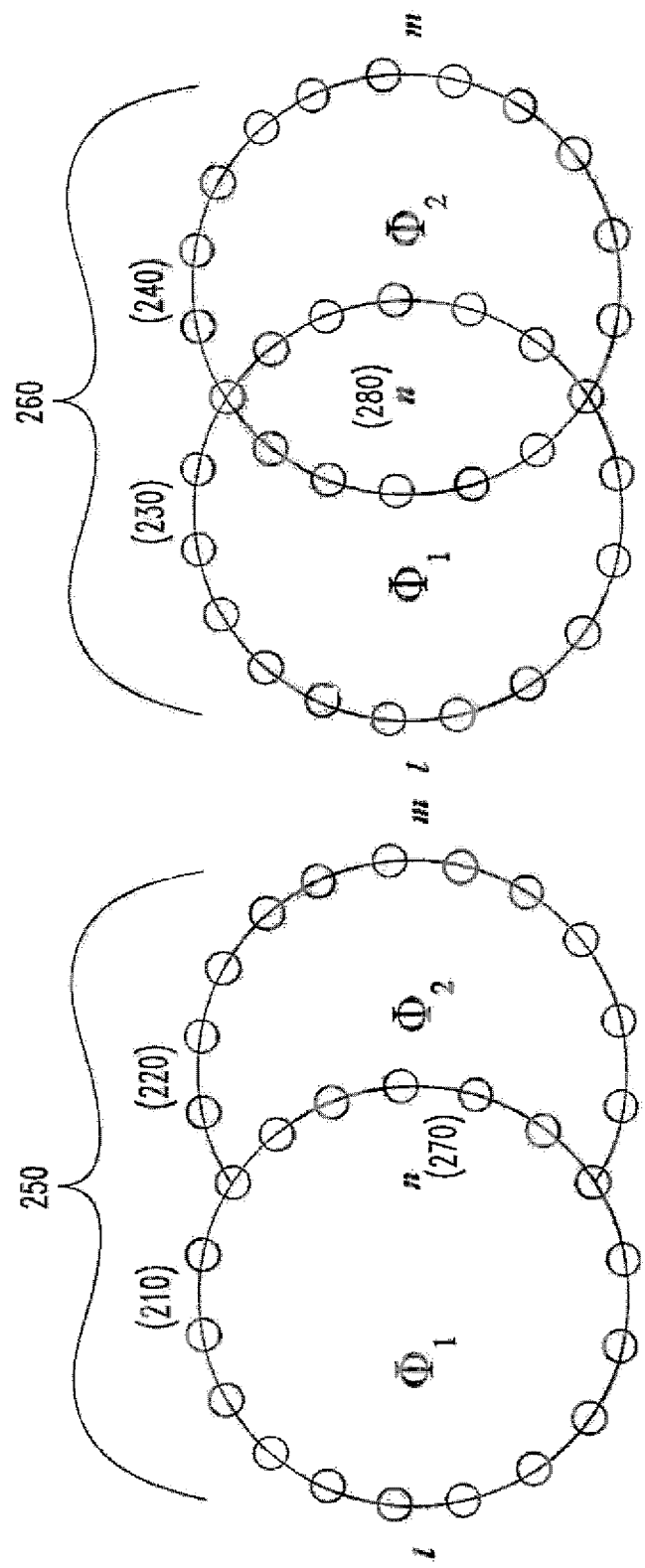
FIG. 2 is a generalized representation of single-bond and double bound AB ring network configurations.

FIG. 2 is a generalized representation of single-bond 250 and double bound 260 AB ring network configurations. A generalized equivalent topology of an (l,m,n) configuration with spacing in units of atomic spacing "a" 113 for the left ring (210, 230), right ring (220, 240), and common center path (270, 280), respectively, can be formulated for both a single-bond and double-bond and is shown in FIG. 2. In the M3 (105, 110) cases of FIG. 1, (l,m,n) is equal to (2,2,1). Similarly, the M4 (115, 120) cases of FIG. 1, (l,m,n) have a topology of (3,3,1), and lastly (l,m,n)=(2,3,1) in the M34 (125, 130) cases in FIG. 1. Note that in the double-bond case, n is still equal to 1, as it describes the distance in spacing, not the number of paths.

The generalized configurations presented in FIG. 2 are the smallest-order scale models possible which can properly categorize electron transport characteristics in every possible coupled AB ring topology, regardless of dimensions. In the generalized configuration of FIG. 2, the transmission behavior of (l,m,n)=(6,6,3), (10,10,5), or (14,14,7) configurations is equivalent to that of (2,2,1), which has an odd M=3 number of atoms. However, these are all configurations which have been scaled-up an odd number of times. When the same (2,2,1) network is scaled-up by an even factor, such as 2, then a single ring now contains an even M=6 number of atoms, and can no longer be fall under the odd-odd (M3) classification. For the odd-even case (M34), this same problems arises, since the left (odd-numbered) ring will end up with an even M=6 number of atoms after scaling by a factor of 2. Similarly, limiting scaling to an odd number of times in the even-even case (M4) preserves the (odd,odd,odd) relationship among path lengths, preserving the electron transport characteristics. In order to preserve transport characteristics for any irreducibly-coupled ring configurations, scaling of the geometries are typically limited to odd factors. However, the set of scaling laws indicate that the transmission and device operation of the inventive AB ring network configurations work identically from the mesoscopic region all the way down to atomic-size rings.

Figure 3:
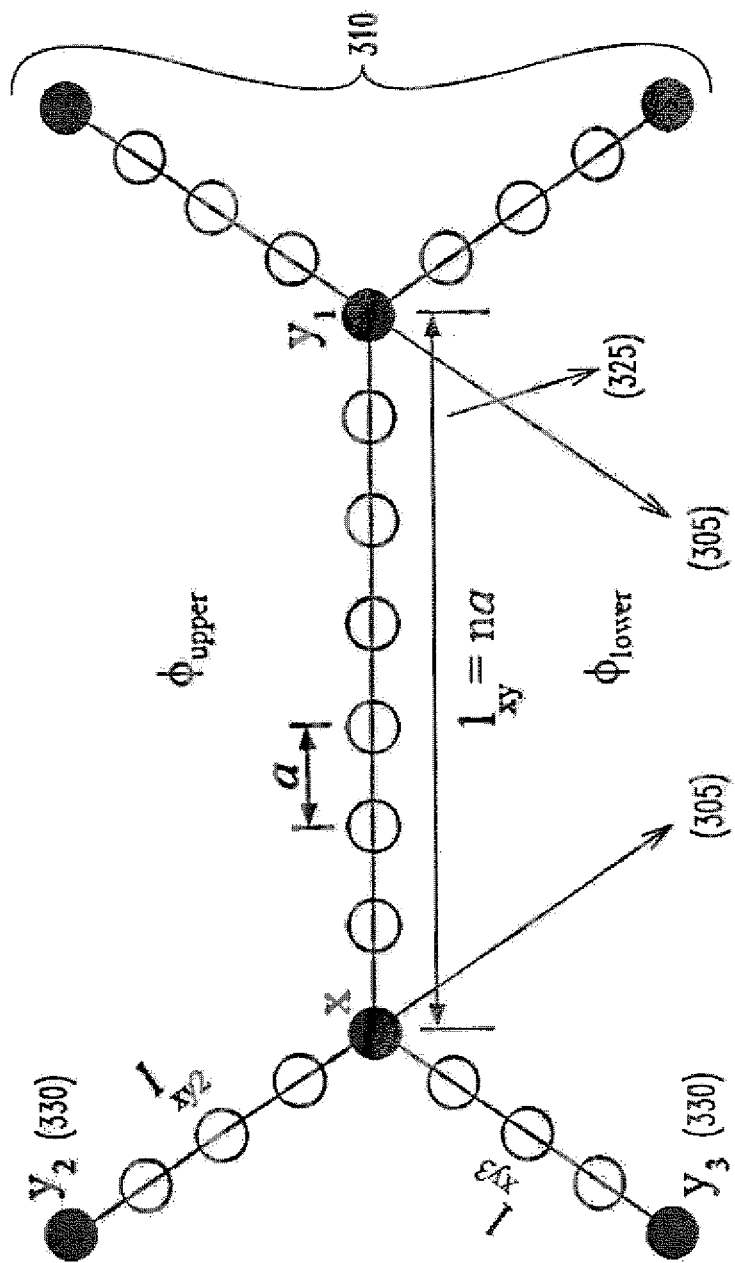
FIG. 3 is a generalized representation of a harmonic oscillator model, in turn representing a one-dimensional ballistic quantum network.

FIG. 3 is a generalized representation of a harmonic oscillator, in turn representing a one-dimensional excitable or ballistic quantum network 310. Dots represent masses. A one-dimensional ballistic quantum network consists of nodes 305 and path length bonds 320 that connect two adjacent nodes 305 together. The electron wave function at any location in such a network 310 for the free electron model is given by the time-independent Schrödinger equation $\hat{H}\Psi(r)=E\Psi(r)$, where the Hamiltonian operator $$\hat{H} = \frac{-\hbar^2}{2m}\nabla^2$$

describes the total energy, $\Psi$ is the wave function of the quantum system, $\hbar$ is the reduced Planck constant. $\hat{H}$ can be generalized to include a periodic potential within the crystalline lattice. Thus an electron wave propagates along a given bond length and is scattered elastically at each node point. In addition, the phase of the electron wave function along a given path can be further modulated by the applied fluxes. The node equation approach reformulates the Schrödinger equation for the network by relating the electron wave functions at each node point 305 with those at neighboring nodes 305. For a given node 315 connected through a bond 320 of length 325 $l_{xy}$, to all the neighboring nodes 330, the resulting node equation for a plane wave along the network is from the Kirchhoff law such that the electron wave function at node x, $\Psi(x)$, satisfies:

$$\left[\sum_y \cot(kl_{xy}) - iD\right]\Psi(x) - \sum_y [\csc(kl_{xy})\exp[i\phi l_{xy}]\Psi(y)] = 0 \quad (1)$$

where $k=\sqrt{2mE}/\hbar$, and E is the electron energy. $\phi$ is related to the applied flux $\Phi$ by $\phi=(2\pi/M)(\Phi/\Phi_0)$, where M is the total number of nodes 305 in a loop (or a ring). $D=(1-R)/(1+R)$, where R is the reflection amplitude if node x is an input terminal from $y_2$ or $y_3$. For example, D=-1 if node x is an output terminal, and D=0 if node x is simply internal by being neither an input nor an output terminal.

Note that the bond lengths 325 are in the unit of multiple atomic spacing ($l_{xy}$=na, for example). Thus even or odd-numbered magnification also applies in the same manner. That is, the same set of scaling rules previously discussed applies.

Setting the flux modulation equal to zero causes Eq. (1) to be similar to coupled harmonic oscillators of the same topology with a mass located at each atom and spring constants associated with all neighboring atoms, as shown in FIG. 3. In the general situation of a (l,m,n) configuration with spacing in units of atomic spacing as shown in example 2, for the left ring, right ring, and common center path, respectively, all the eigenenergies must satisfy the following equation, for the single-bond case:

$$3\sin(kl)\sin(km)\sin(kn) - \qquad (2)$$
$$2\begin{bmatrix} \cos(kl)\cos(km)\sin(kn) + \\ \cos(km)\cos(kn)\sin(kl) + \\ \cos(kn)\cos(kl)\sin(km) \end{bmatrix} + 2[\cos(l\phi_1 + m\phi_2)\sin(kn) +$$
$$\cos(l\phi_1 + n\phi_3)\sin(km) + \cos(m\phi_2 - n\phi_3)\sin(kl)] = 0$$

where $\phi_3 = (\phi_1 - \phi_2)$. Similarly, for the double-bond case the eigenenergies satisfy:

$$3\sin(kl)\sin(km)\sin(kn) - \qquad (3)$$
$$\begin{bmatrix} \cos(kl)\cos(km)\sin(kn) + \\ 2\cos(km)\cos(kn)\sin(kl) + \\ \cos(kn)\cos(kl)\sin(km) \end{bmatrix} + [\cos(l\phi_1 + m\phi_2)\sin(kn) +$$
$$2\cos(l\phi_1 + n\phi_3)\sin(km) + 2\cos(m\phi_2 - n\phi_3)\sin(kl)] = 0$$

Note that in either the single bond case or the double bound case, the flux periodicity is generally determined by the last three terms in equation (2) or (3) where the cosine functions repeat. Further, note that the flux periodicity is independent of the type of bond, since the expressions inside the cosines for the two equations only change as a function of atomic spacing's in the network. Thus a structure's flux periodicity is preserved between single and double-bond interactions. The resulting persistent current is defined from the eigenenergies as $I=-c(\partial E_{tot}/\partial \Phi)$, where c is a constant, $\Phi$ is the applied flux, and $E_{tot}$ is the sum of the occupied energy states up to the Fermi level.

Alternatively, the flux periodicity may be determined from the magnetic vector potential $\vec{A}$ when the areas of each ring are equal (l=m). Referring to FIG. 2, the closed path integral formed by the left or right ring, for example, is $\oint \vec{A} \cdot dl = (l+n)\vec{A}$. However when fluxes are penetrating both loops simultaneously, the modulated phase along the two-dimensional Brillouin zone, or common center path, is now a function of both $\phi_1$ (106) and $\phi_2$ (107). When $\phi_1$ (106) and $\phi_2$ (107) are equal, the modulated length of the center path n is zero because the fluxes' phases effectively cancel each other out since they are in opposite directions. Conversely, if $\phi_1$ (106) and $\phi_2$ (107) are opposite ($\phi_1 = -\phi_2$), the modulated length is actually doubled since the fluxes' phases effectively add together now that they are in the same direction. Analytically, the flux periodicity can thus be defined as the ratio of the sum of the two total path integrals for each ring, to the sum of their effective path integrals during interaction. Thus the flux periodicity is $[2(l+n)\vec{A}/2(l)\vec{A}]\Phi_0 = [(l+n)/l]\Phi_0$ when the fluxes are of equal sign and $[2(l+n)\vec{A}/2(l+2n)\vec{A}]\Phi_0 = [(l+n)/(l+2n)]\Phi_0$ when they are opposite. For the M3 structures (105 and 110) in FIG. 1, this corresponds to (3/2) $\Phi_0$ and (¾) $\Phi_0$, respectively. So by changing the sign of the fluxes being applied, it is possible to demonstrate a double-flux periodicity effect in an M3S or M3D network.

Figure 4:
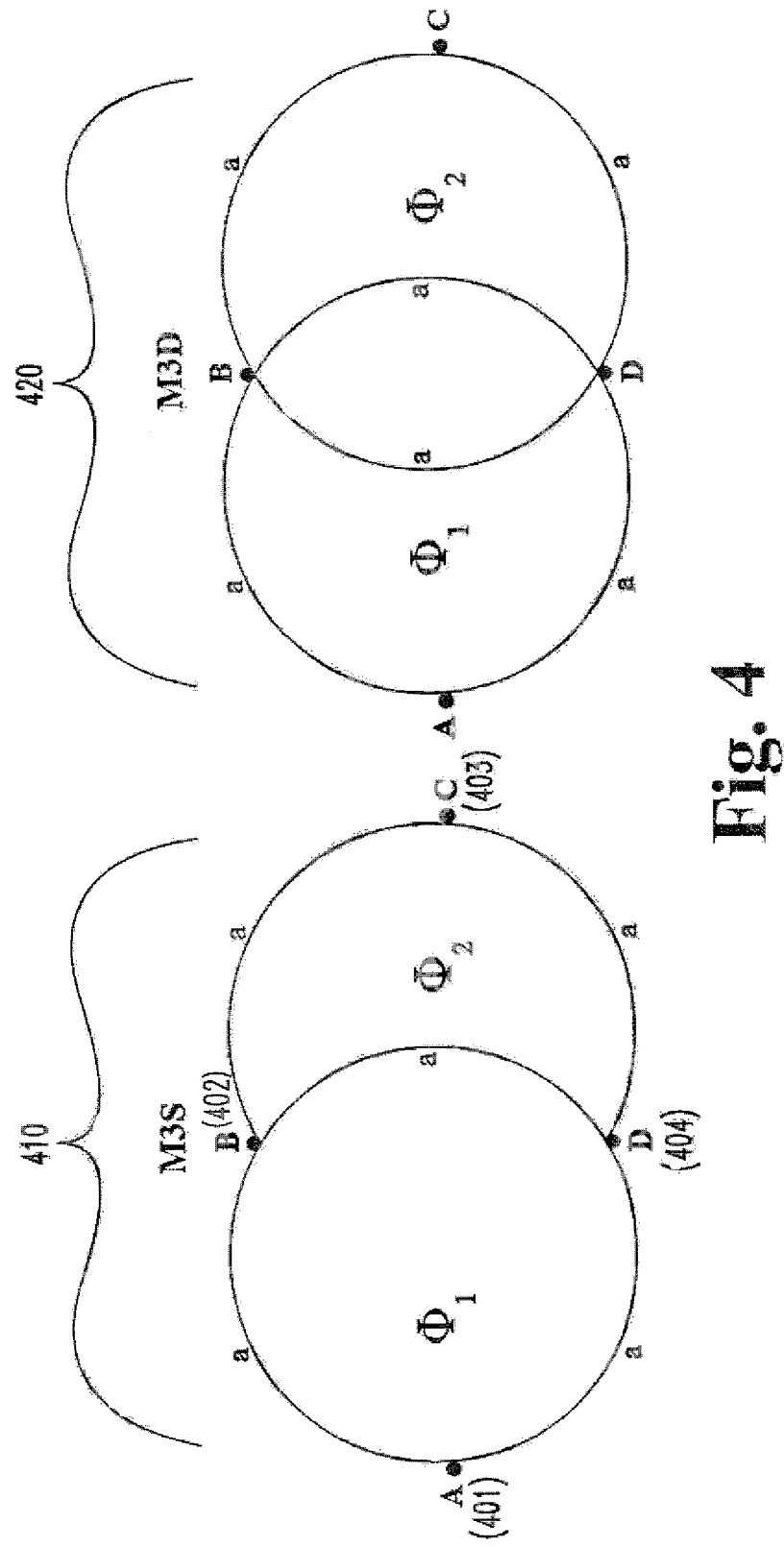
FIG. 4 is a generalized representation of a M3S and a M3D irreducibly-coupled AB ring network configuration.
Figure 5B:
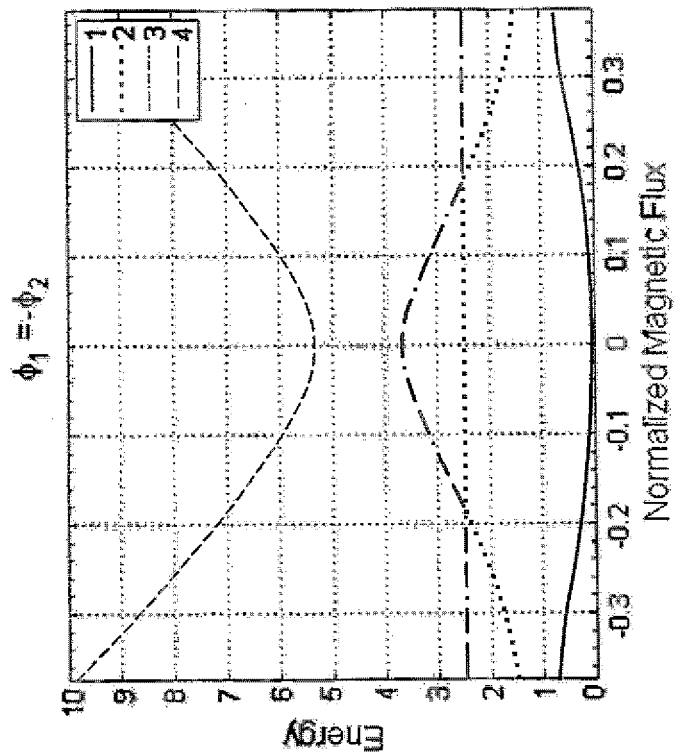
FIGS. 5A-5H are a collection of graphs showing the electron energies and resulting persistent currents in M3S and a M3D irreducibly-coupled AB ring network configurations.
Figure 5A:
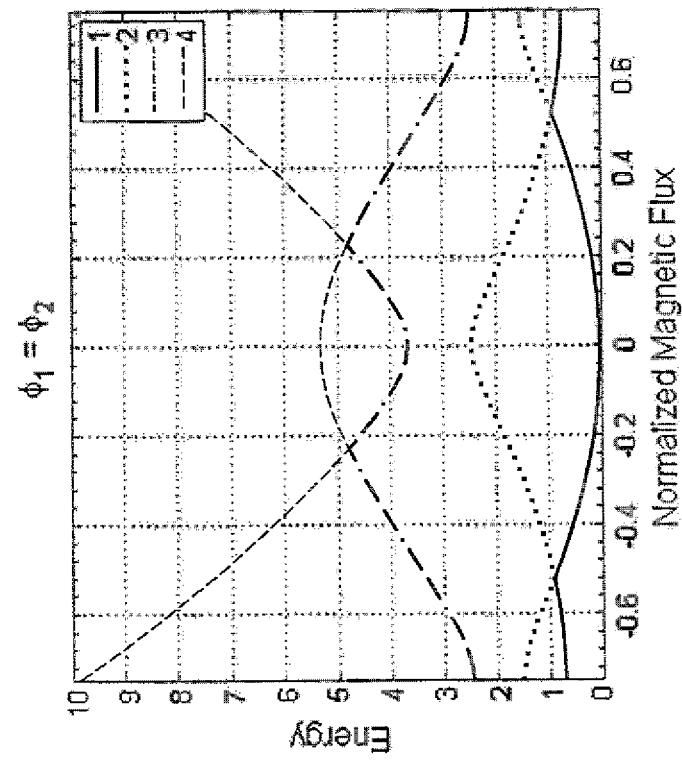
Figure 5D:
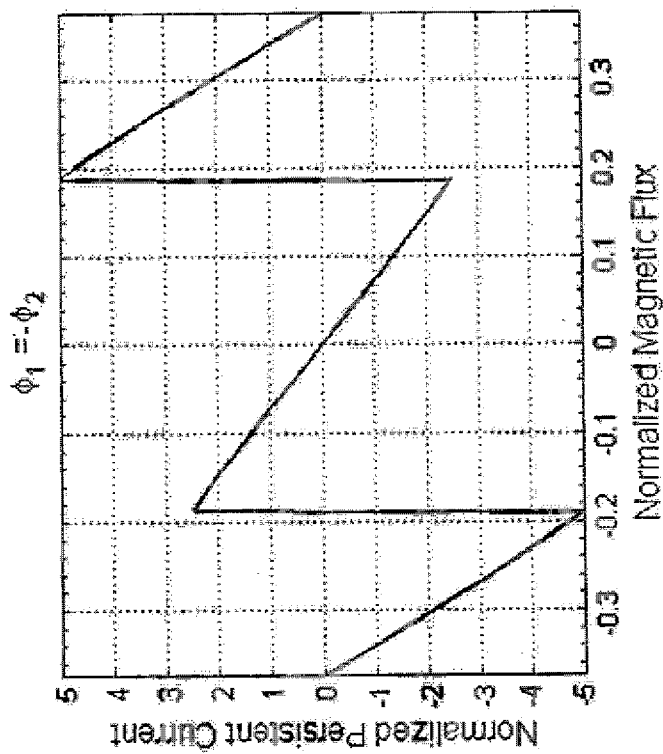
Figure 5C:
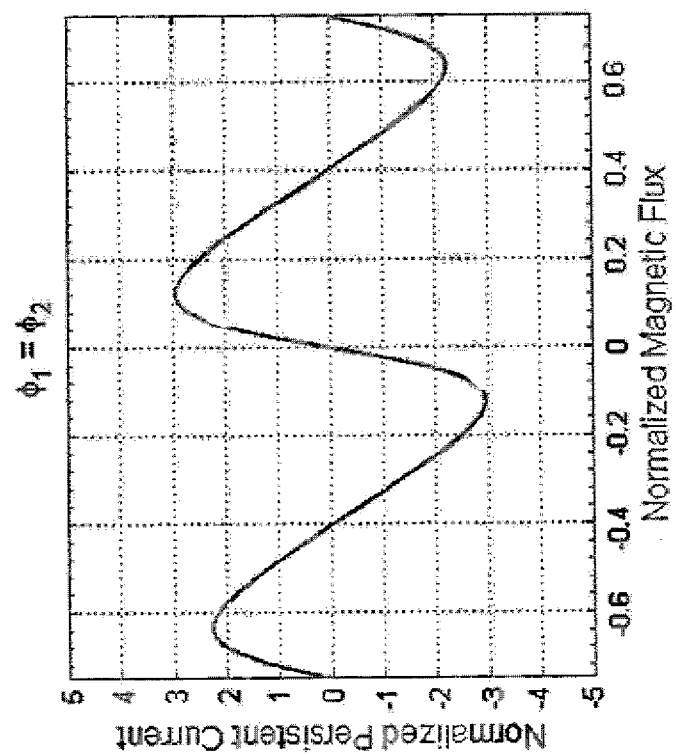
Figure 5F:
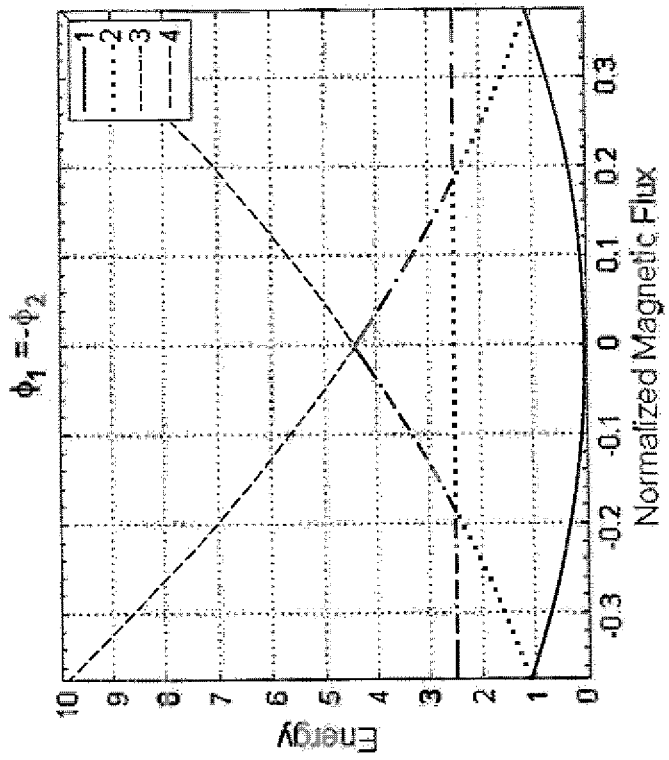
Figure 5E:
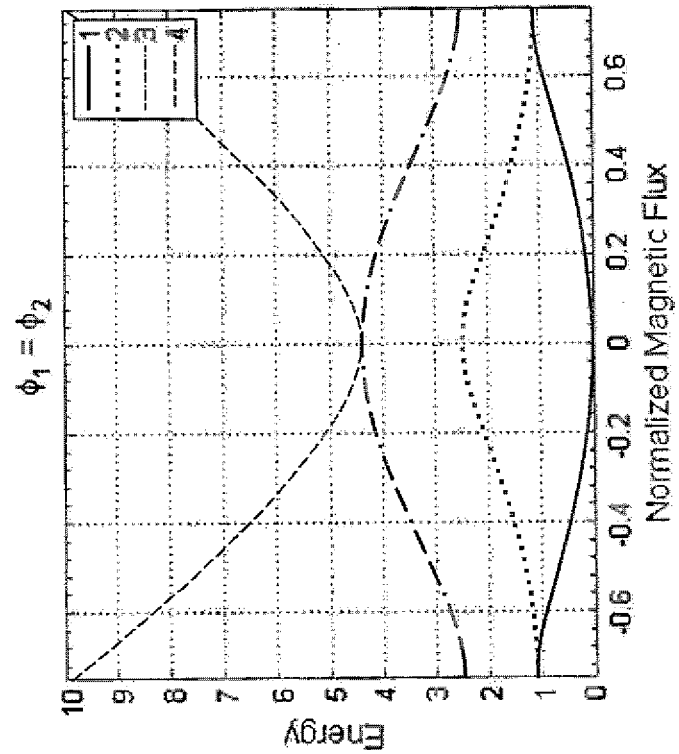
Figure 5H:
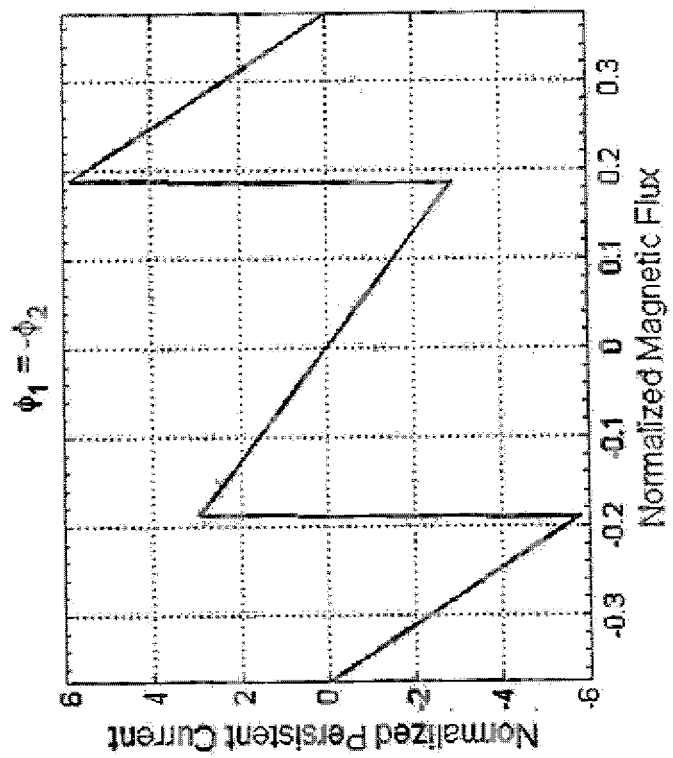
Figure 5G:
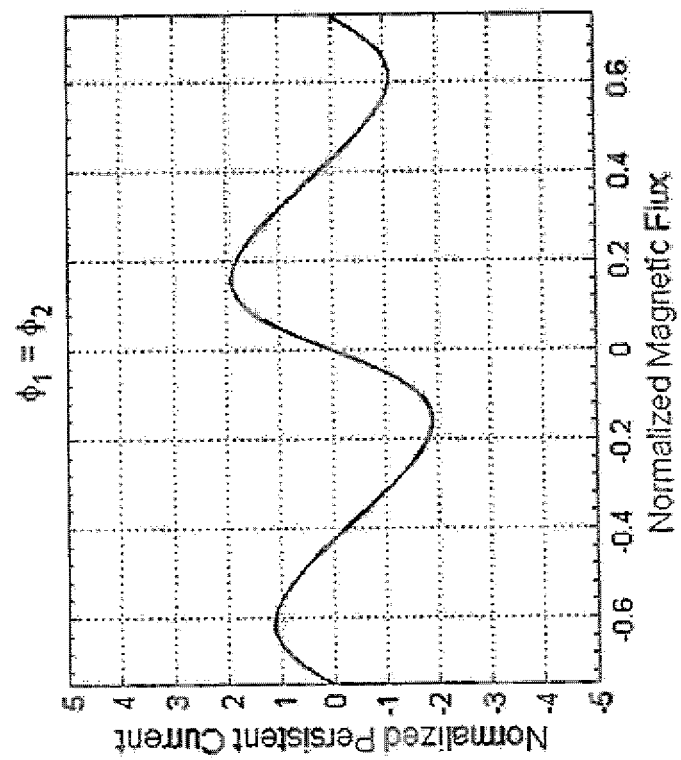

FIG. 4 is a generalized representation of a M3S 410 and a M3D 420 irreducibly-coupled AB ring network configuration. When two odd AB rings are irreducible merged together, such as M3S 410 and a M3D 420, the four node equations for the four nodes 305, labeled as nodes A, B, C and D, 401, 402, 403, 404 from Eq. (1), reduce to:

$$2\cos(ka)\Psi(A) - \exp[i\phi_1 a]\Psi(B) - \exp[-i\phi_1 a]\Psi(D) = 0 \qquad (4)$$

$$n\cos(ka)\Psi(B) - \exp[-i\phi_1 a]\Psi(A) - \exp[i\phi_2 a]\Psi(C) - n'\exp[i(\phi_1-\phi_2)a]\Psi(D) = 0 \qquad (5)$$

$$2\cos(ka)\Psi(C) - \exp[i\phi_2 a]\Psi(D) - \exp[i\phi_2 a]\Psi(B) = 0 \qquad (6)$$

$$n\cos(ka)\Psi(D) - \exp[i\phi_1 a]\Psi(A) - \exp[-i\phi_2 a]\Psi(C) - n'\exp[i(\phi_2-\phi_1)a]\Psi(B) = 0 \qquad (7)$$

where $\Psi(A)$ is the electron wave function at node A and so on. n=3 and n'=1 for the single-bond case (M3S) while n=4 and n'=2 for the double-bond case (M3D). $\phi_1=(2\pi/M_1)(\Phi/\Phi_0)$, where $M_1$ is the number of nodes on ring M1 (3, in M3S and M3D cases) and $\Phi_0$ is the elementary flux quanta. The relation to the applied flux at ring M2 can be defined, in a similar fashion, for $\phi_2$. Note, a similar derivation can be performed for the M4S, M4D, M34S, and M34D AB ring networks.

Note, in the event that there is a potential associated with each node, then the cos(ka) factor in Eqs. (4-7) for the plane wave will be replaced with a form factor as shown in Eq. (1). The resulting equations lead to the requirement for the electron energy E with respect to the applied fluxes, shown in FIG. 5 graphs 510 and 520 for the M3S case, and resulting persistent currents in FIG. 5 graphs 530 and 540, where M3S⁺ describes when $\Phi_1=\Phi_2=\Phi$ and M3S⁻ describes when $\Phi_1=-\Phi_2=\Phi$. Following the same sign convention, the eigenenergies and resulting persistent currents for the M3D case are shown in FIG. 5 graphs 550 and 560. The flux period describing when the three cosines repeat in Eqs. (2) and (3) is $\Phi=(3/2)\Phi_0$ for M3S⁺ and M3D⁺, and $\Phi=(¾)\Phi_0$ for M3S⁻ and M3D⁻.

FIG. 5A-H are a collection of graphs A-H showing the electron energies and resulting persistent currents in M3S 410 and a M3D 420 irreducibly-coupled AB ring network configurations. Graphs A and B represent the band structures for M3S+ and M3S−, Graphs C and D represent the persistent current for M3S+ and M3S−. Graphs E and F represent the band structure for M3D+ and M3D−. Graphs G and F represent the persistent current for M3D+ and M3D−.

Figure 6:
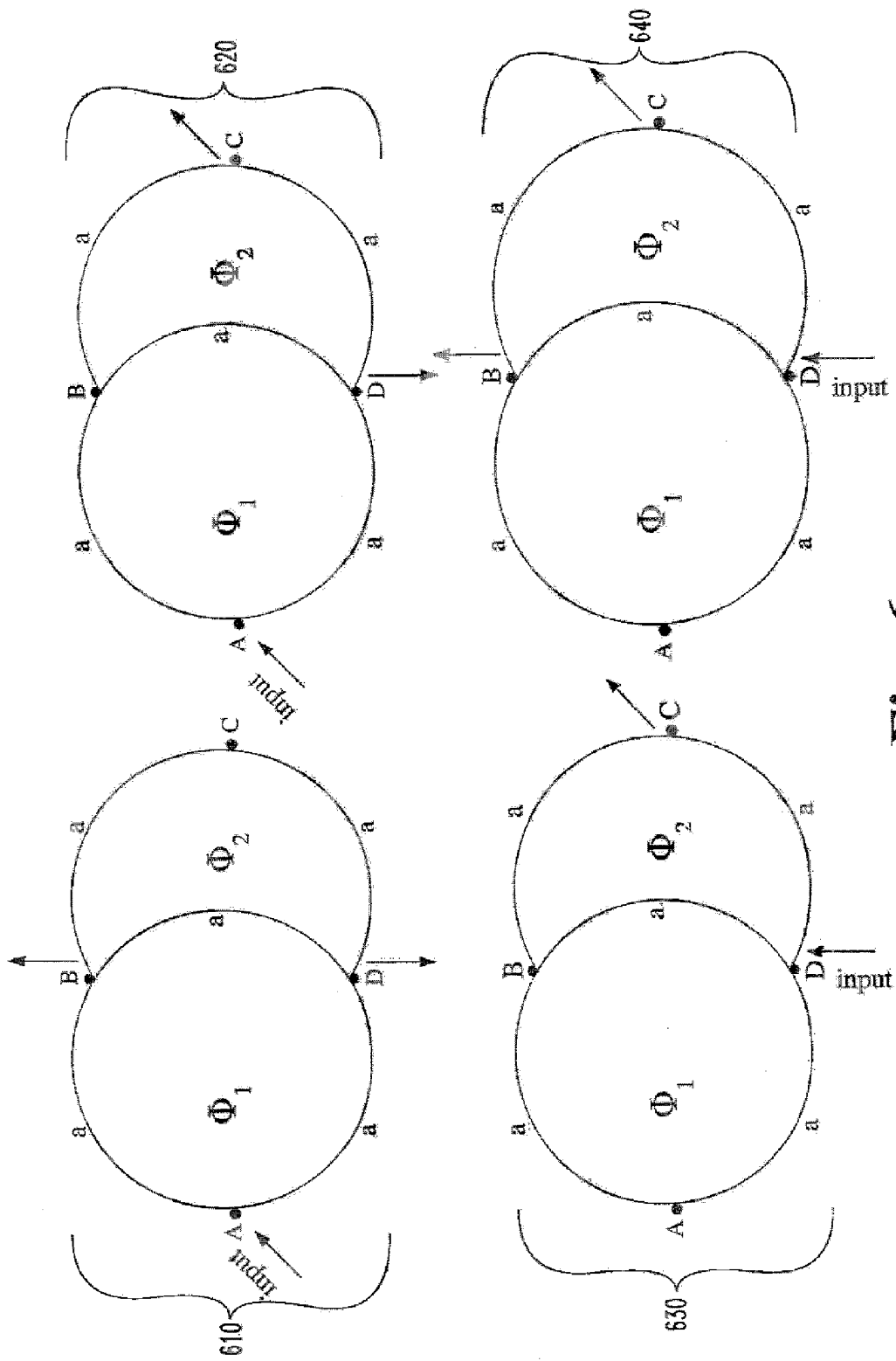
FIG. 6 is a generalized representation of the four possible M3S irreducibly-coupled AB ring network configuration with three terminals attached.
Figure 7B:
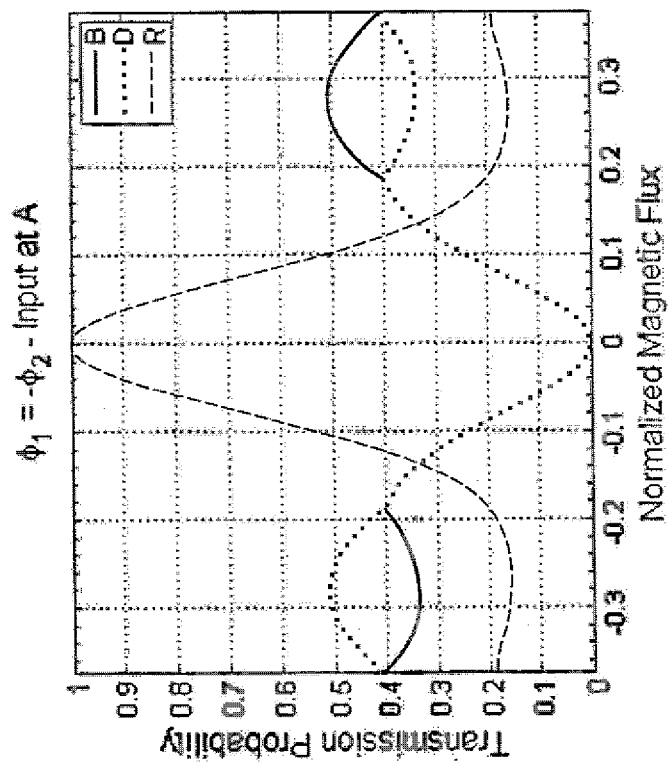
FIGS. 7A-7H are a collection of graphs showing transmission probabilities for the four different three terminal connection for a M3S AB irreducibly-coupled AB ring network configurations.
Figure 7A:
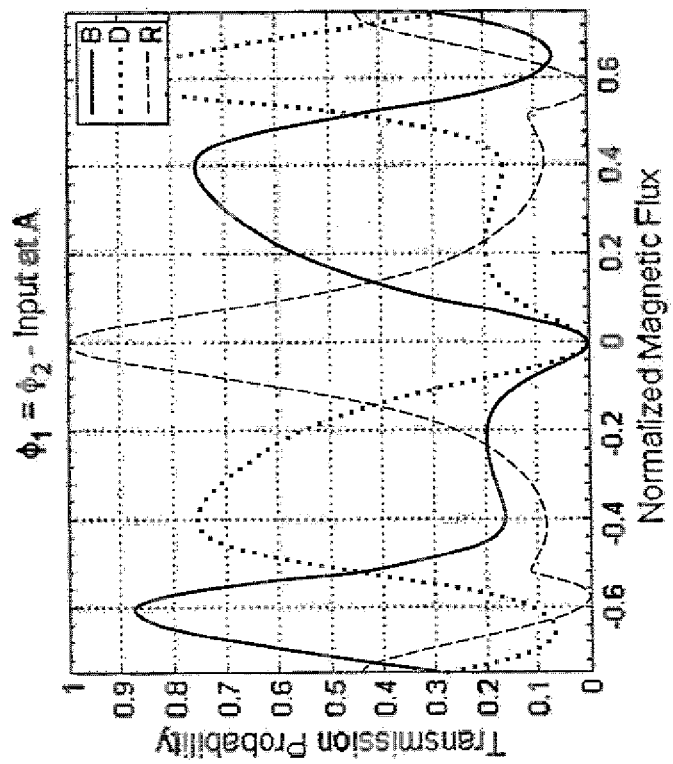
Figure 7D:
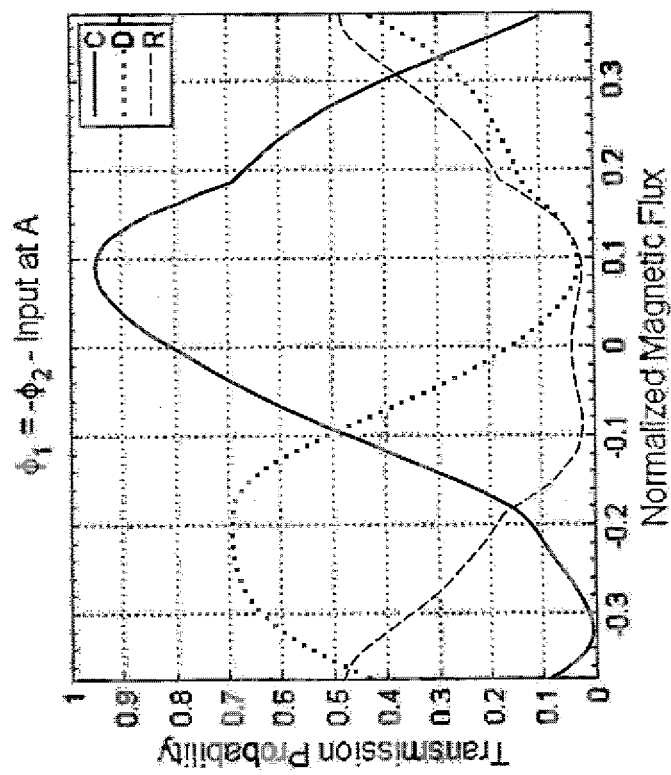
Figure 7C:
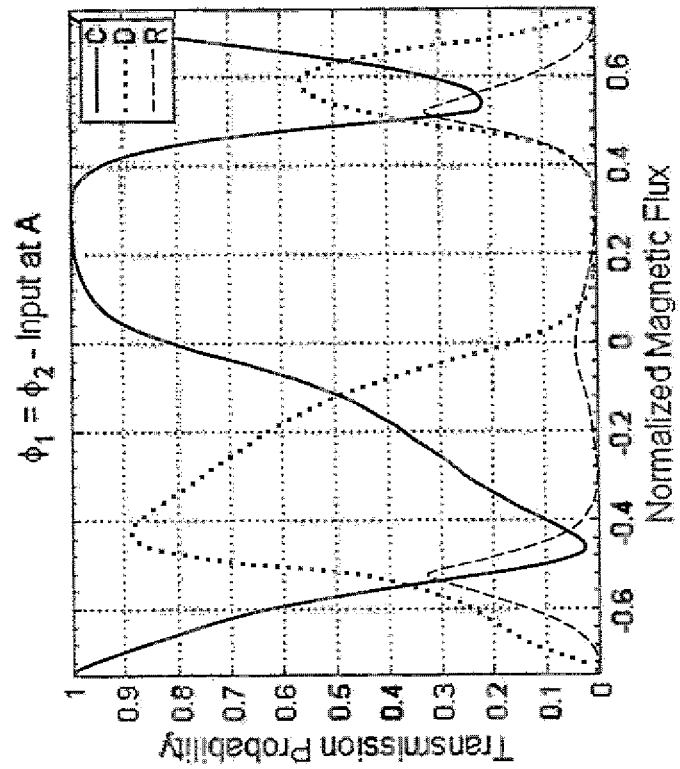
Figure 7F:
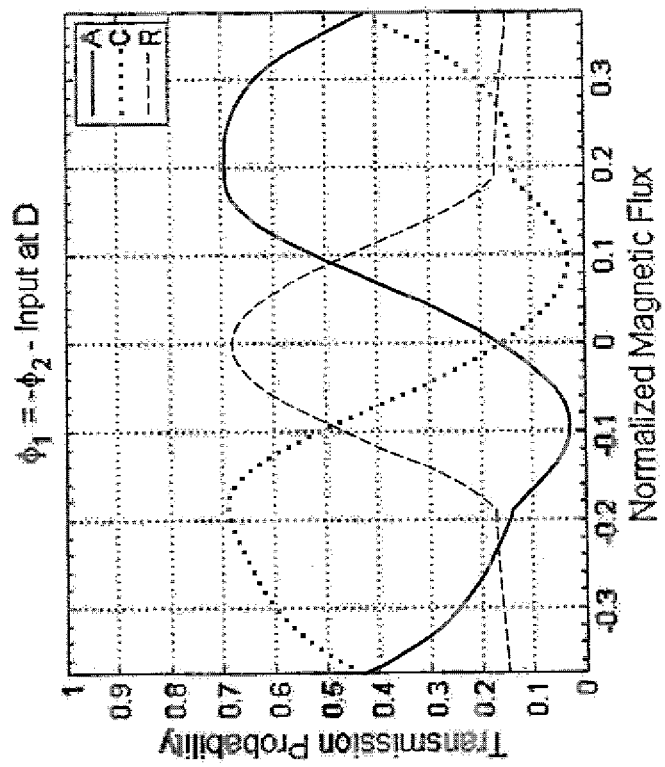
Figure 7E:
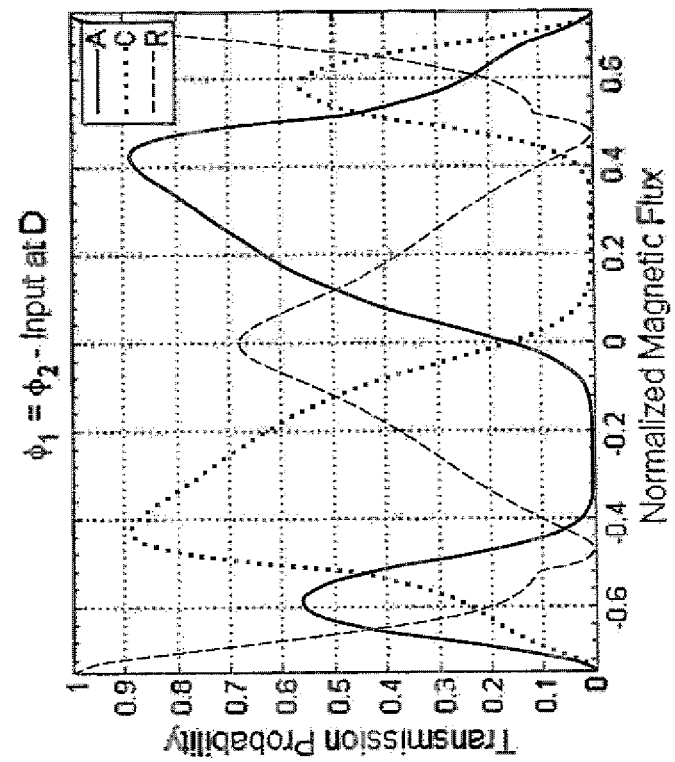
Figure 7H:
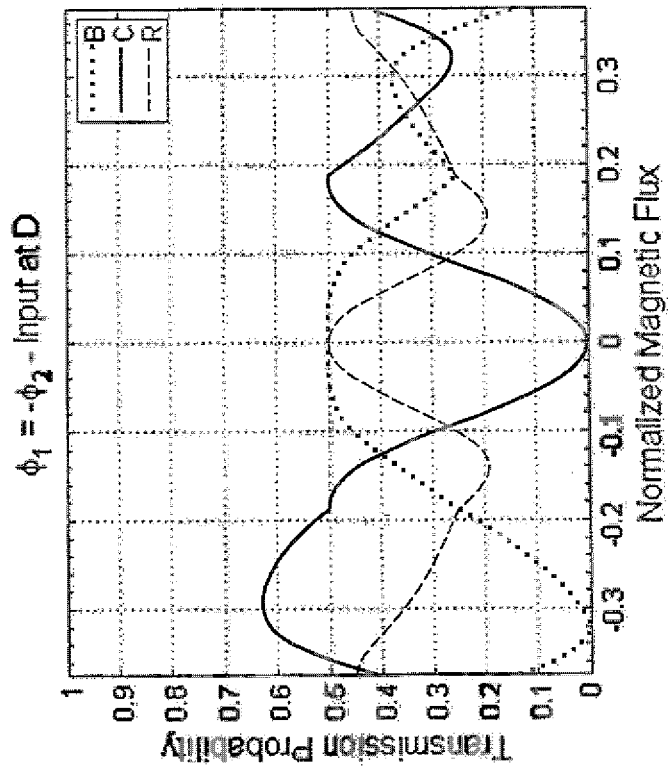
Figure 7G:
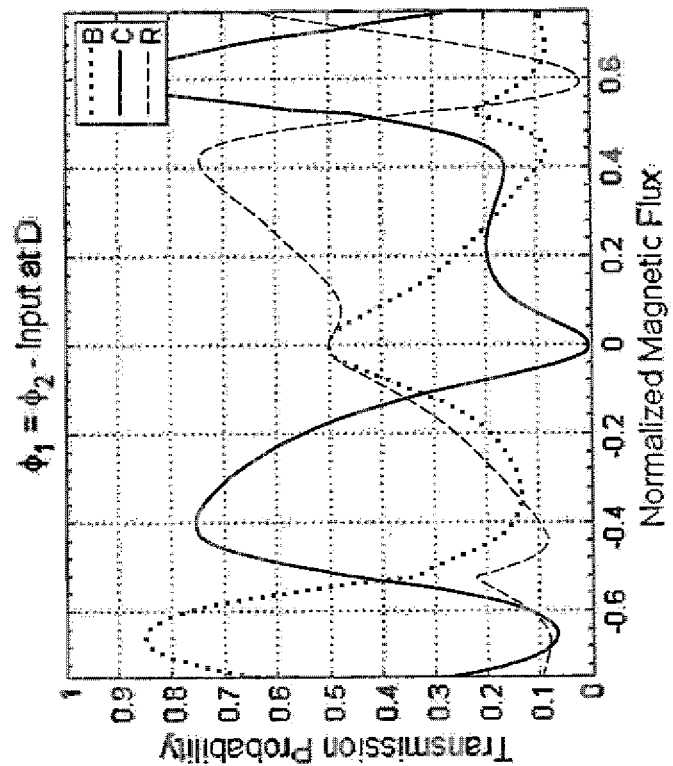
Figure 8B:
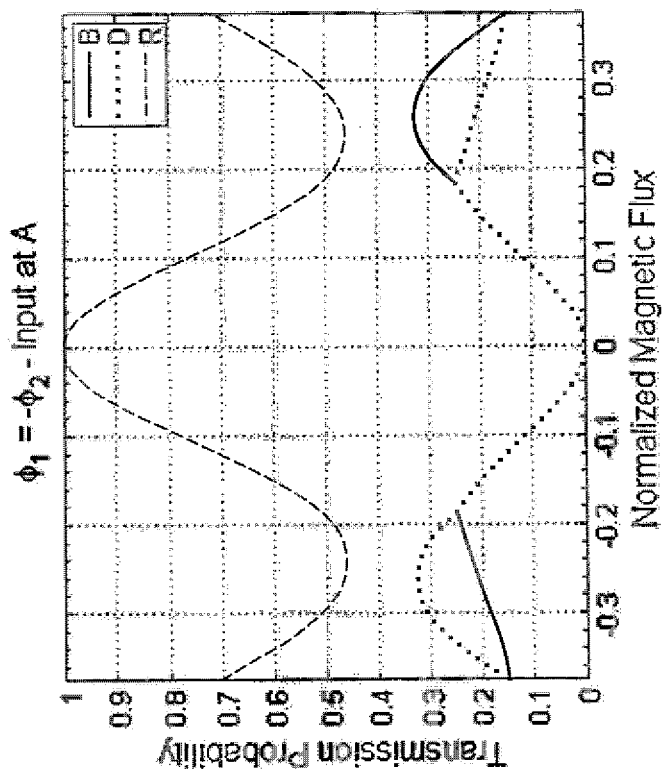
FIGS. 8A-8H are a collection of graphs showing transmission probabilities for the four different three terminal connections for a M3D AB irreducibly-coupled AB ring network configurations.
Figure 8A:
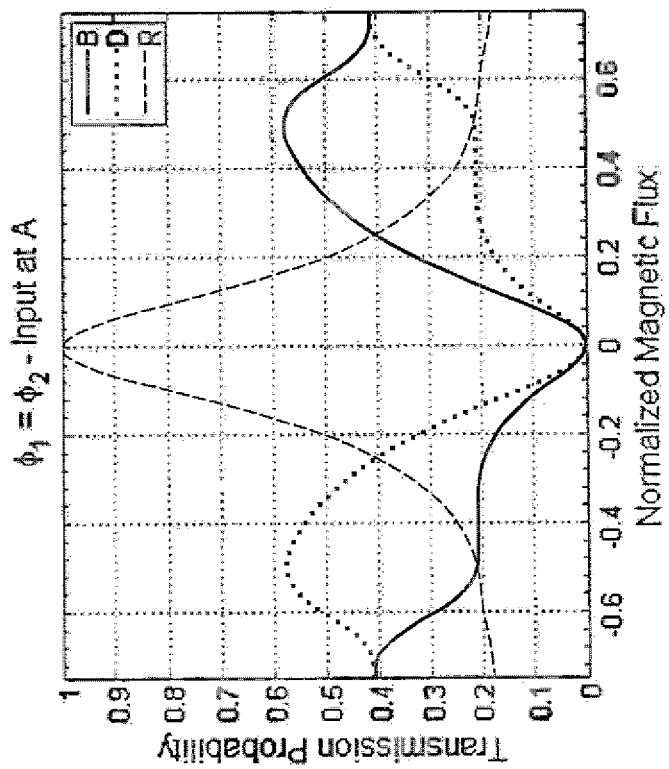
Figure 8D:
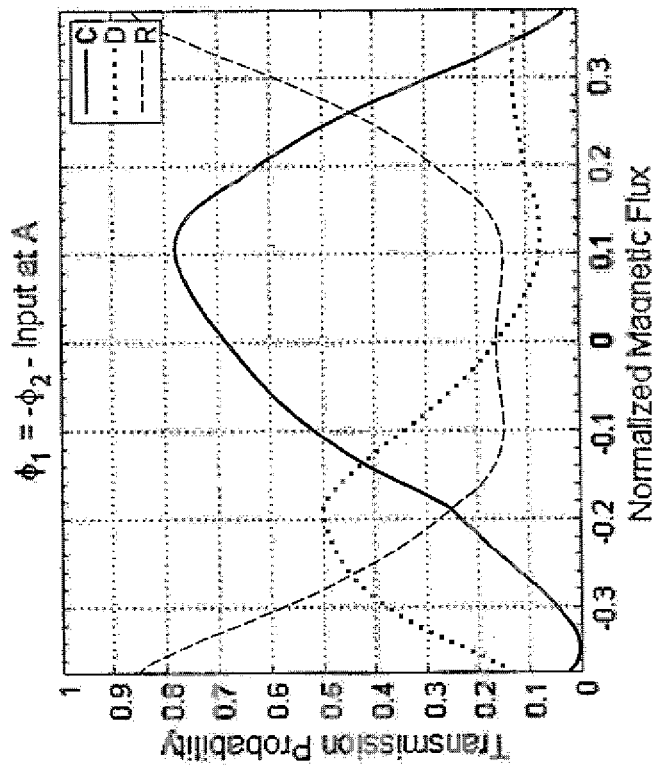
Figure 8C:
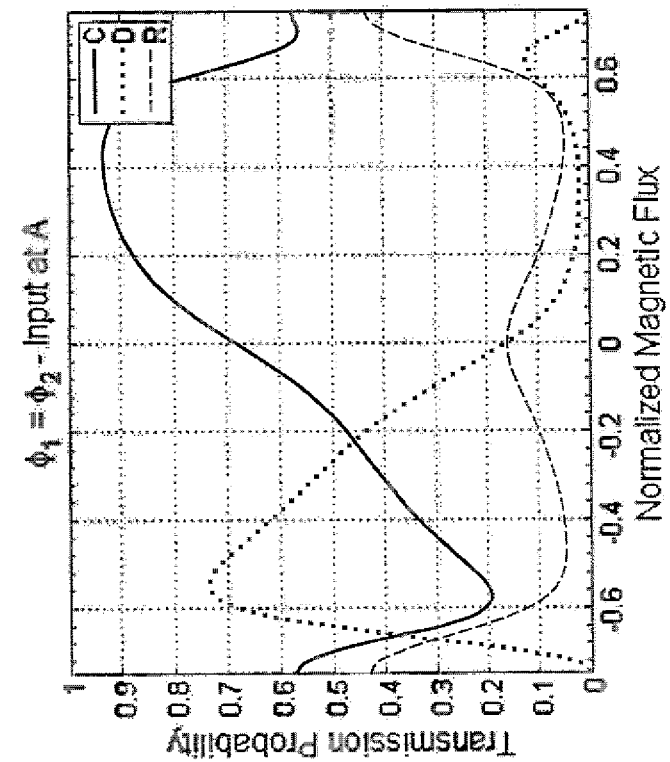
Figure 8F:
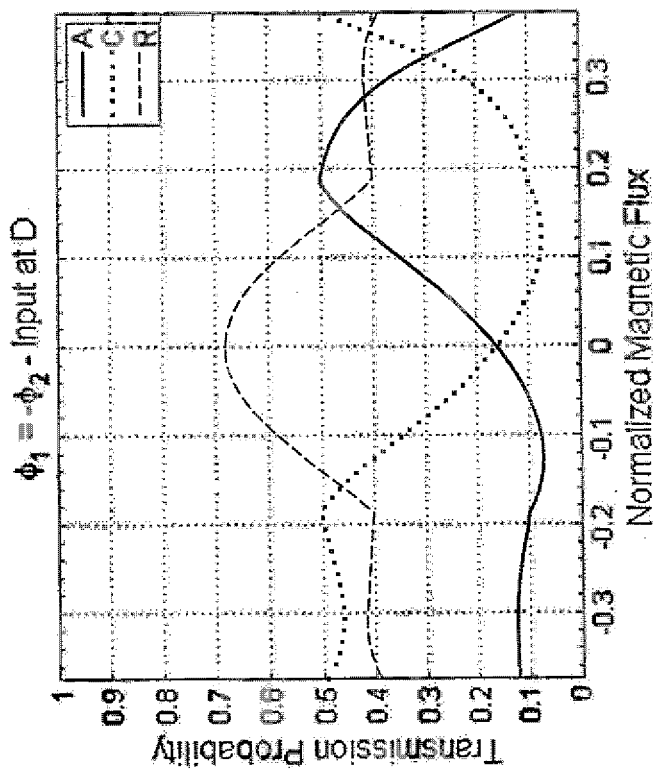
Figure 8E:
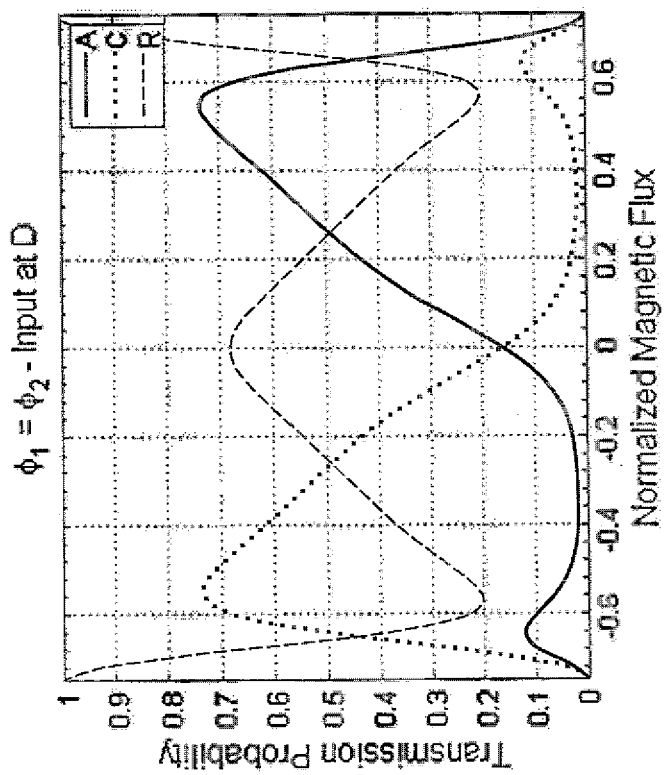
Figure 8H:
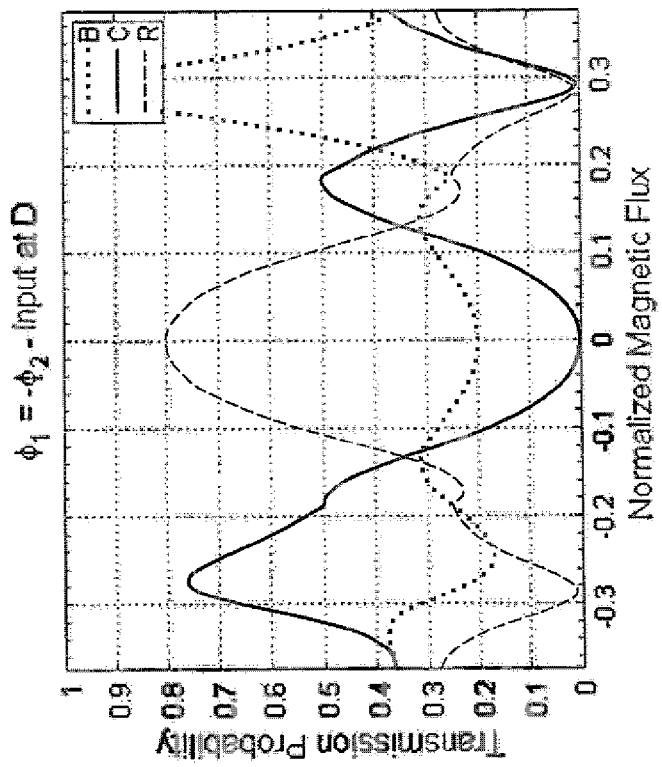
Figure 8G:
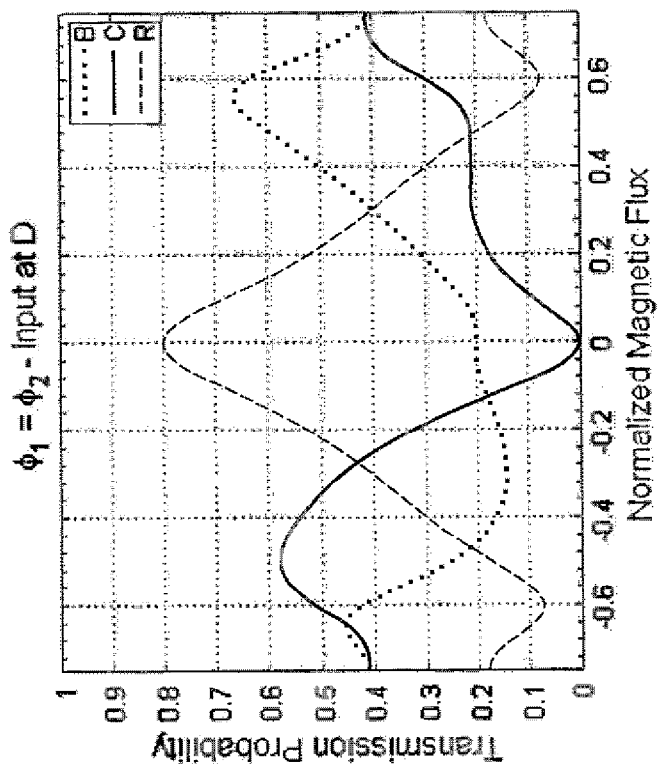

FIG. 6 is a generalized representation of the four possible M3S irreducibly-coupled AB ring network configuration with three terminals attached. There are only four different unique configurations of transmission because all other configurations are the equivalent of the represented four varieties due to the Büttiker symmetry principle. For convenience, the configurations can be denoted as ABD 610, ACD 620, DAC 630 and DBC 640, which are shown for the single-bond M3S class in FIG. 6. The first letter of the three letter configuration denotes the location of input and a reflection signal (if any), while the subsequent letters denote outputs. For example, an ABD configuration denotes the input is from terminal A and while the outputs are terminals B and D (labeled as B and D) as well as the reflection R at terminal A. When the two applied fluxes are of equal sign, the network and its transmission results are referred to as ABD+, while for the opposite sign case ABD−. FIGS. 7A-7H shows the transmission probabilities of the four different three terminal connection configurations for a M3S AB irreducibly-coupled AB ring network configuration.

FIGS. 7A-H are a collection of graphs A-H showing transmission probabilities for the four different three terminal connections for a M3S AB irreducibly-coupled AB ring network configuration. Graphs A and B represent the transmission probabilities of M3S ABD+ and M3S ABD−. Graphs C and D represent the transmission probabilities of M3S ACD+ and M3S ACD−. Graphs E and F represent the transmission probabilities of M3S DAC+ and M3S DAC−. Graphs G and H represent the transmission probabilities of M3S DBC+ and M3S DBC−.

FIGS. 8A-H are a collection of graphs A-H showing transmission probabilities for the four different three terminal connections for a M3D AB irreducibly-coupled AB ring network configurations. The double bound in the M3D AB irreducibly-coupled AB ring network provides two possible paths that an electron may traverse as it persists in the network. The extra phase modulation provided by having two center common paths yields different transmission results for the otherwise same terminal configurations as presented in the single-bond (M3S) structures. Graphs A and B represent transmission probabilities of M3D ABD+ and ABD−. Graphs C and D represent transmission probabilities of M3D ACD+ and ACD−. Graphs E and F represent transmission probabilities of M3D DAC+ and DAC−. Graphs G and H represent transmission probabilities of M3D DBC+ and DEC−.

Figure 9A:
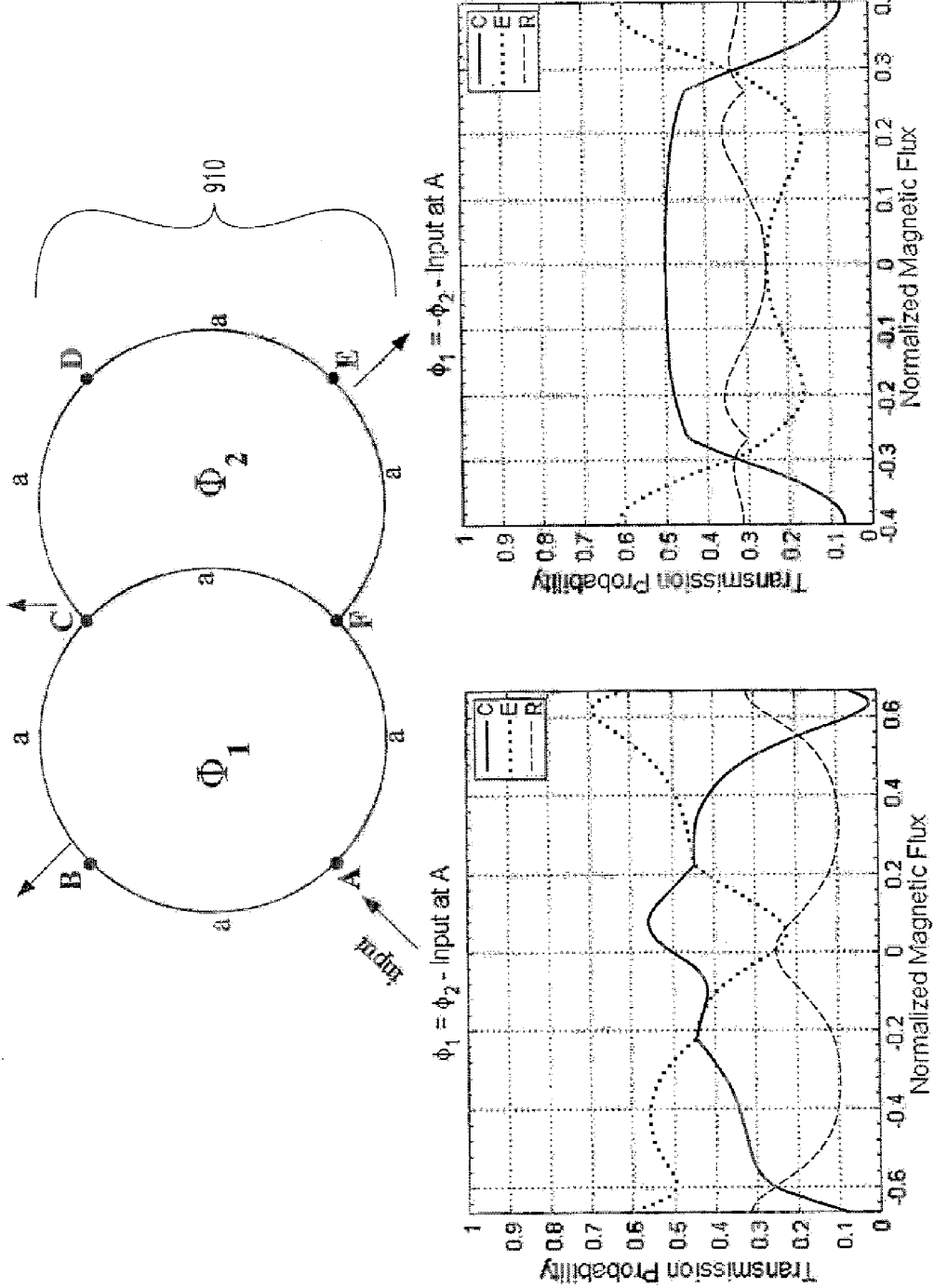
FIGS. 9A-9D are a collection of generalized representations of a portion of the M4S and M4D irreducibly-coupled AB ring network configurations with three terminals attached along with graphs showing their respective transmission probabilities.
Figure 9B:
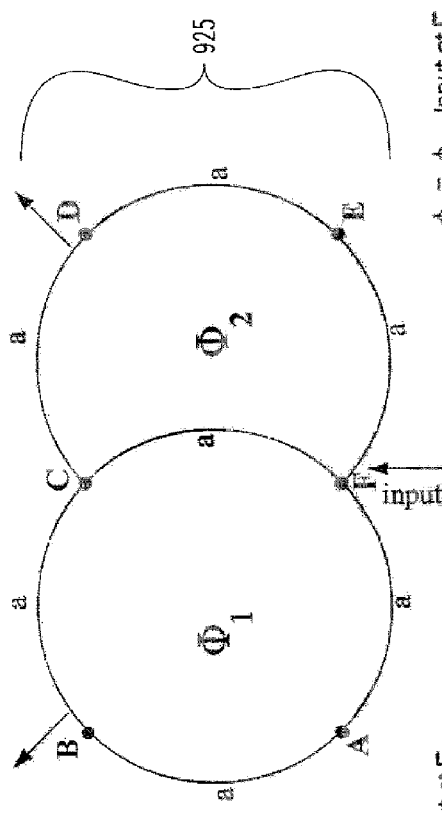
Figure 9B:
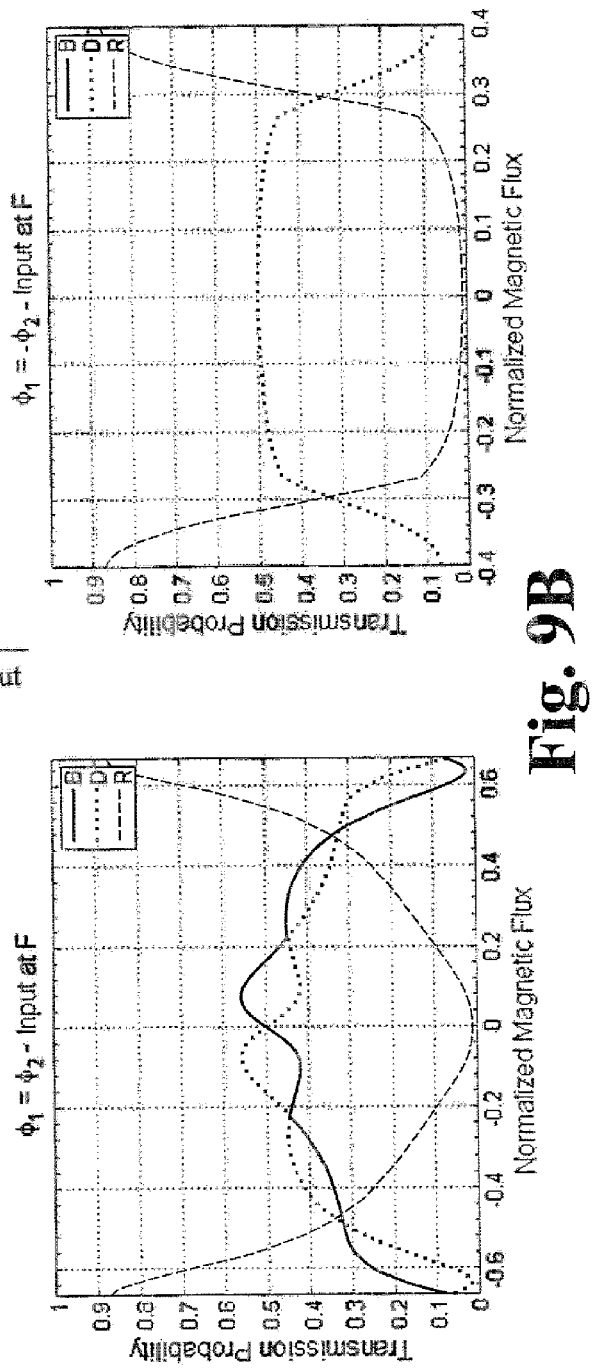
Figure 9C:
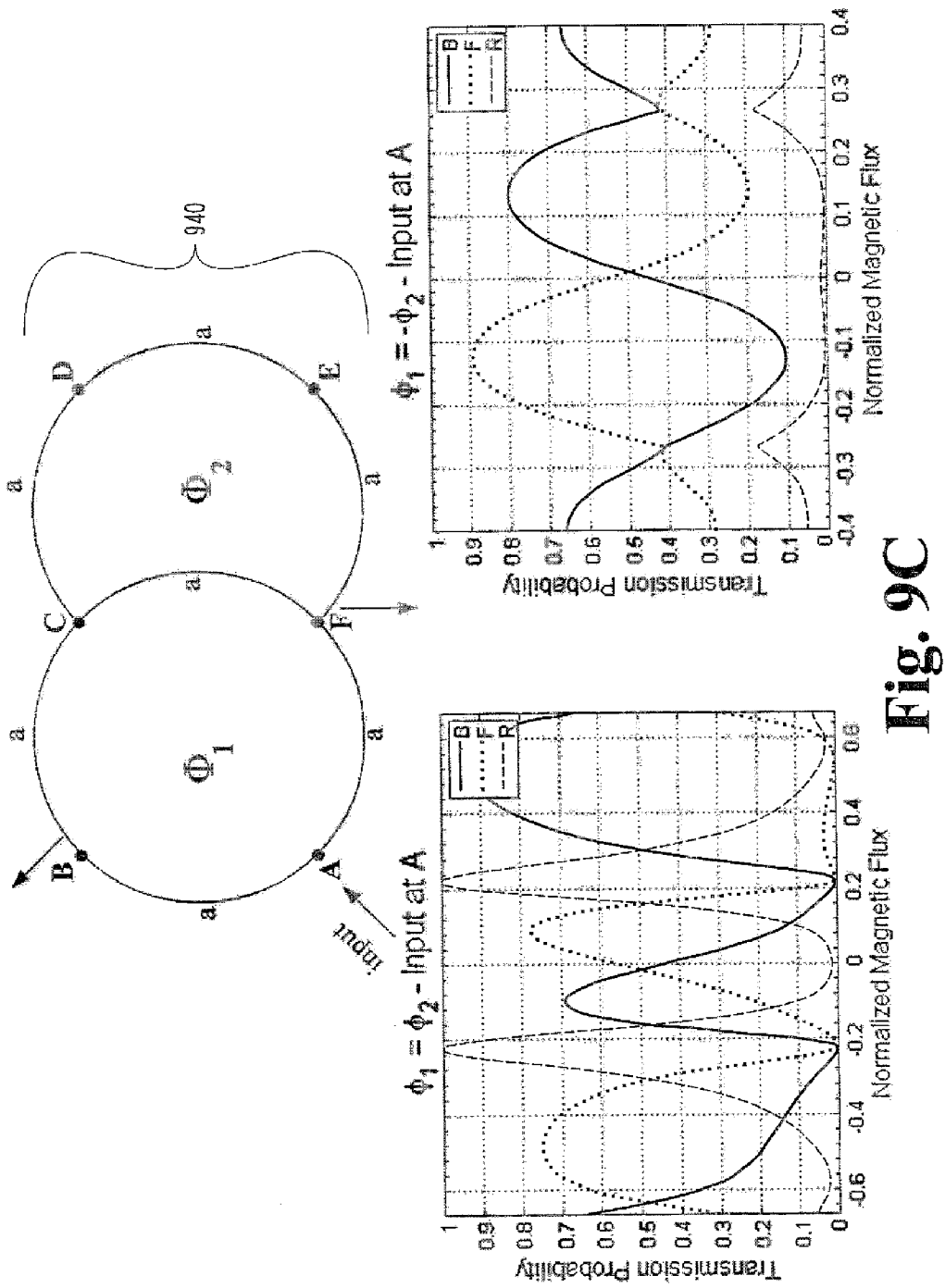
Figure 9D:
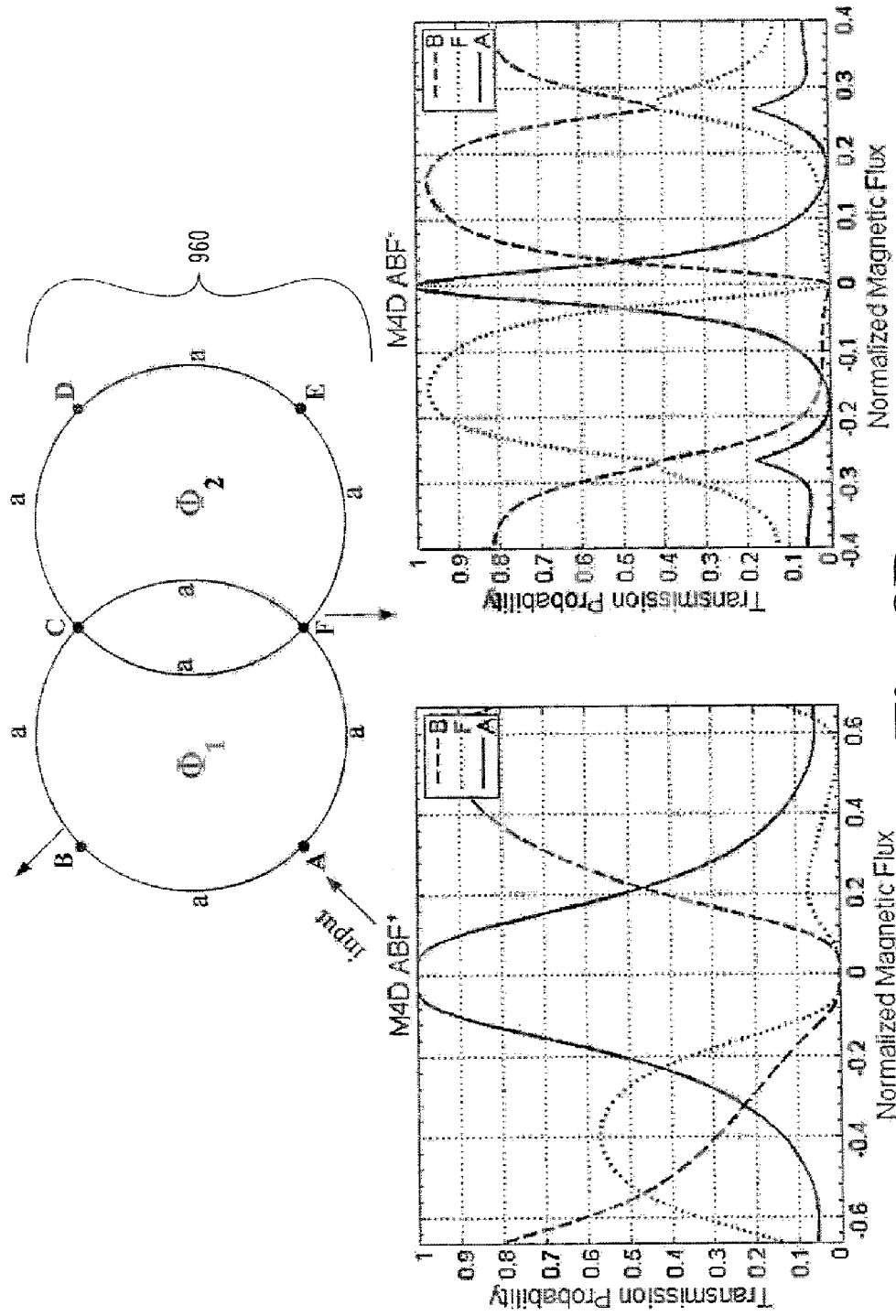

FIGS. 9A-9D are a collection of generalized representations of a portion of the M4S and M4D irreducibly-coupled AB ring network configurations with three terminals attached along with graphs A-H showing their respective transmission probabilities. The M4S and M4D configurations each have 16 different possibly unique configurations of electron transport when configured with three terminals. Due to the large possible number of different configurations, only a select few of those configurations are presented 910 represents the configuration of a M4S ACE AB ring network configuration. The corresponding graphs of FIG. 9A represent transmission probabilities of M4S ACE+ and ACE−. 925 of FIG. 9B represents the configuration of M4S FBD AB ring network configuration. The corresponding graphs of FIG. 9B represent transmission probabilities of M4S FBD+ and FBD−. 940 of FIG. 9C represents the configuration of M4S ABF AB ring network configuration. The corresponding graphs of FIG. 9C represent the transmission probabilities of M4S ABF+ and ABF−. 960 of FIG. 9D represents the configuration of M4D ABF AB ring network configuration. The corresponding graphs of FIG. 9D represent the transmission probabilities of M4D ABF+ and ABF−.

Figure 10:
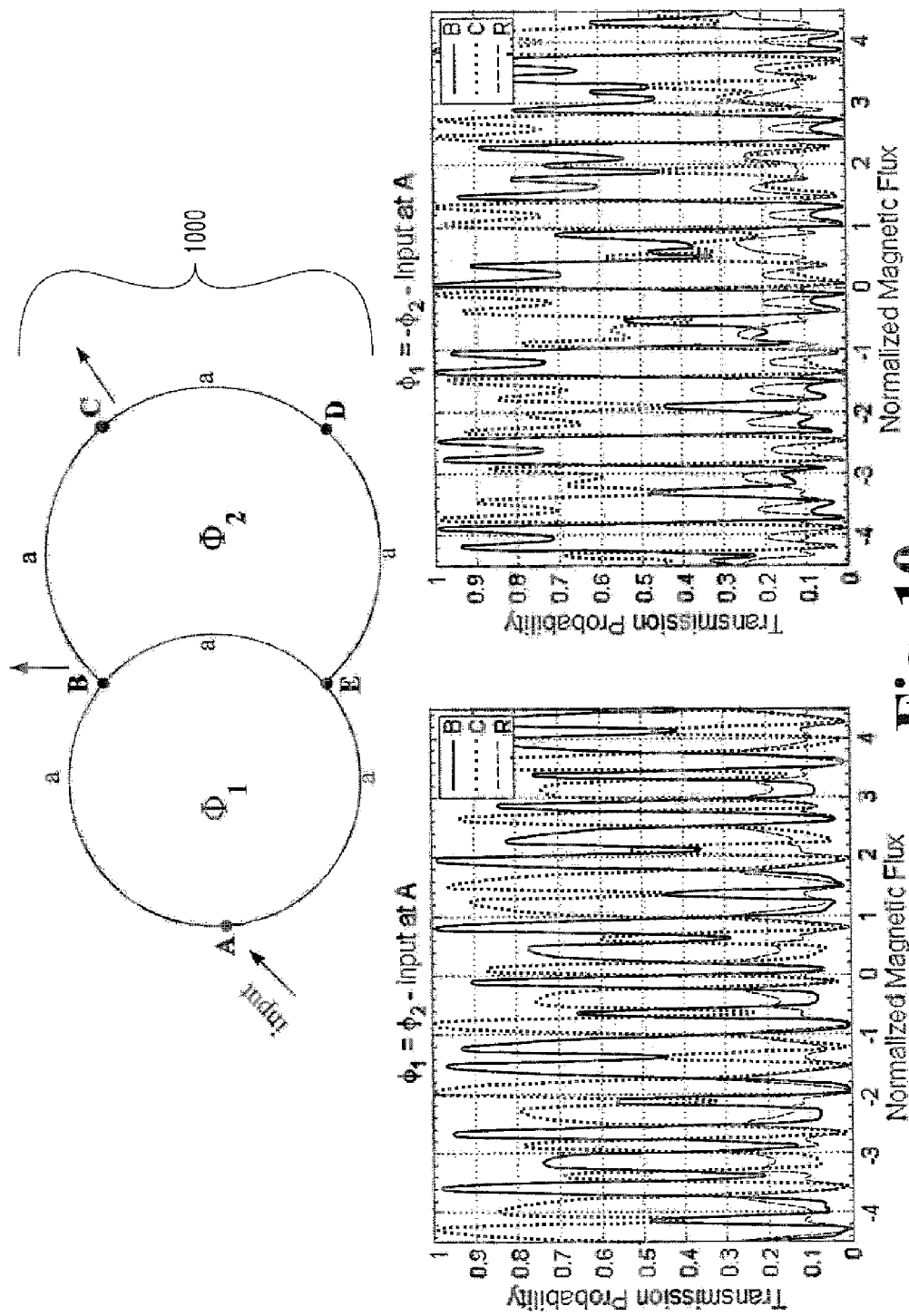
FIG. 10 is a generalized representation of a M34S irreducibly-coupled AB ring network configuration with three terminals attached along with graphs showing its respective transmission probabilities.

FIG. 10 is a generalized representation of a M34S irreducibly-coupled AB ring network configuration with three terminals attached along with graphs A-B showing its respective transmission probabilities. The M34S and M34D configurations each have eighteen different possibly unique configurations of electron transport when configured with three terminals. Further, the flux periodicity for the M34S and M34D configurations is large, making such configurations likely less useful for constructing logic circuits. As such, only the M34S for the ABC configuration is shown. 1000 represents the configuration of M34S ABC AB ring network configuration. Graphs A and B respectively represent transmission probabilities of graph M34S ABC+ and ABC−.

Figure 11:
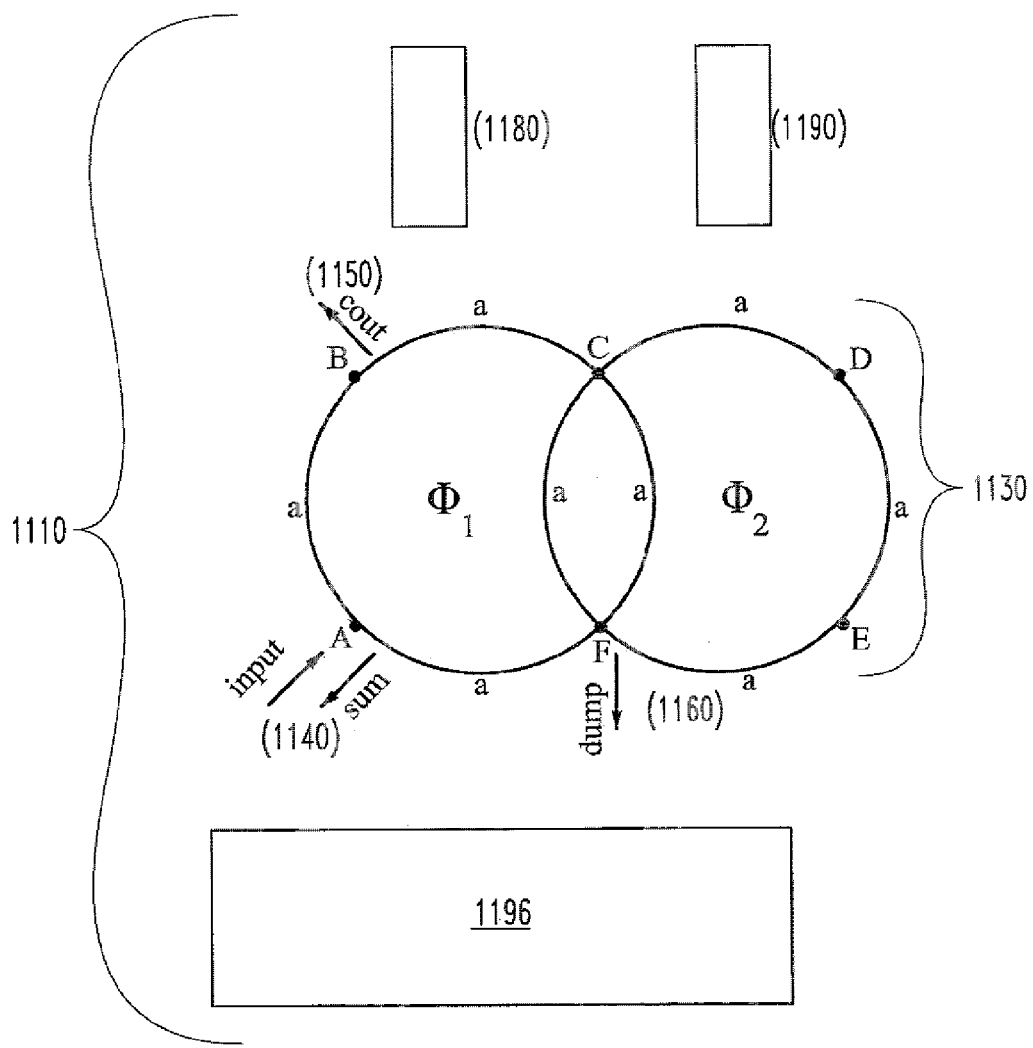
FIG. 11 is a block diagram of an example implementation of an AB ring quantum computing circuit.

FIG. 11 is a block diagram of an example implementation of an AB ring quantum computing circuit 1110. Digital logic operations can thus be performed by collections of irreducibly-coupled AB ring networks where the irreducibly-coupled AB ring networks consisting of AB ring configurations with three or more terminals and selected upon the basis of their electron transmission behavior. For example, a half-adder, a typical digital construct able to add two bits and produce the sum and a possible carry, can be implemented as irreducibly-coupled AB ring 1130 as a M4D structure with terminal configuration ABF as shown in FIG. 11. A 1140 is the applied current source to the network, as well as the measured sum output, made possible by using a three terminal quantum circulator at the node 1170. B 1150 is the carry out (cout), while F 1160 is the dump, which provides a return path for the current to prevent unwanted transmissions for the sum and carry out terminals under certain logic conditions.

Inputs to the circuit can be of the form of currents or in the form of applied fluxes for each ring. In some implementations, inputs in the forms of currents are test signals while the applied fluxes are the bits to be computed or added. Fluxes are applied to the rings through flux inducers 1180 and 1190 respectively applying flux $\Phi_1$ and $\Phi_2$. For example, the flux inducers 1180 and 1190 can be implemented as solenoids, switchable halbach arrays, and the like. In some implementations, a flux-mapping strategy is employed that causes fluxes to be of equal magnitude can only differ by opposite sign. This flux-mapping strategy leads to four distinct possible input combinations (just like a half-adder) shown in table 1. The outputs A 1140, B 1150, and F 1160 can be received by a device 1200, propagated to other AB ring circuits, and the like. For example, the device 1196 could be bit array where multiple AB circuits 1130 feed into to produce a large binary result. As another example, the device 1196 could be bit array configured to relay a received cout value back to the solenoids 1180 and 1190, enabling addition to be performed through iterative operation of the AB ring quantum computing circuit 1110, thus enabling function as a full adder.

The irreducibly-coupled AB ring 1130 can be formed from any metal or sufficiently electrically conductive material, typically a superconductor. For example, the irreducibly-coupled AB ring 1130 may be made of gold and, typically, chilled to very low temperatures. As another example, the irreducibly-coupled AB ring 1130 could be implemented as an oxide superconductor, such as Y—Ba—Cu-oxide or Tl—Ba—Cu-oxide, and cooled with liquid nitrogen to below its critical superconducting temperature $T_C$.

TABLE 1

Rules for $M_4D$ ABF half-adder flux mapping relationships

| Half-adder Rule | Input Bits to Add | Flux Mapping $(\Phi_1, \Phi_2)$ | Logical Outputs at Terminals | Satisfied at $(\Phi_1, \Phi_2)$ | Transmission Results | FIG. 12 Location |
|---|---|---|---|---|---|---|
| I | 0 0 | (↑, ↓) | A (sum) = 0<br>B (cout) = 0 | (−0.1, +0.1) $\Phi_0$ | $T_A = 0.1$<br>$T_B = 0.1$ | I-sum<br>I-cout |

TABLE 1-continued

Rules for M₄D ABF half-adder flux mapping relationships

| Half-adder Rule | Input Bits to Add | Flux Mapping $(\Phi_1, \Phi_2)$ | Logical Outputs at Terminals | Satisfied at $(\Phi_1, \Phi_2)$ | Transmission Results | FIG. 12 Location |
|---|---|---|---|---|---|---|
| II | 0 1 | (↑, ↑) | A (sum) = 1<br>B (cout) = 0 | $(-0.1, -0.1) \Phi_0$ | $T_A = 0.9$<br>$T_B = 0.1$ | II-sum<br>II-cout |
| III | 1 0 | (↓, ↓) | A (sum) = 1<br>B (cout) = 0 | $(+0.1, +0.1) \Phi_0$ | $T_A = 0.9$<br>$T_B = 0.1$ | III-sum<br>III-cout |
| IV | 1 1 | (↓, ↑) | A (sum) = 0<br>B (cout) = 1 | $(+0.1, -0.1) \Phi_0$ | $T_A = 0.1$<br>$T_B = 0.9$ | IV-sum<br>IV-cout |

Figure 12B:
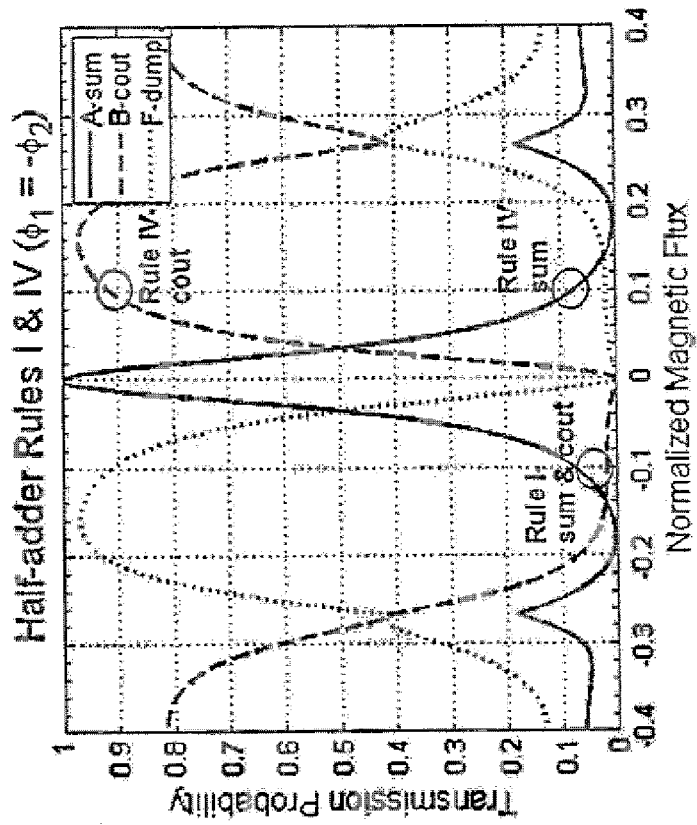
FIGS. 12A-B are a collection of two graphs showing the transmission results for a M4D ABF configuration for use as a half-adder.
Figure 12A:
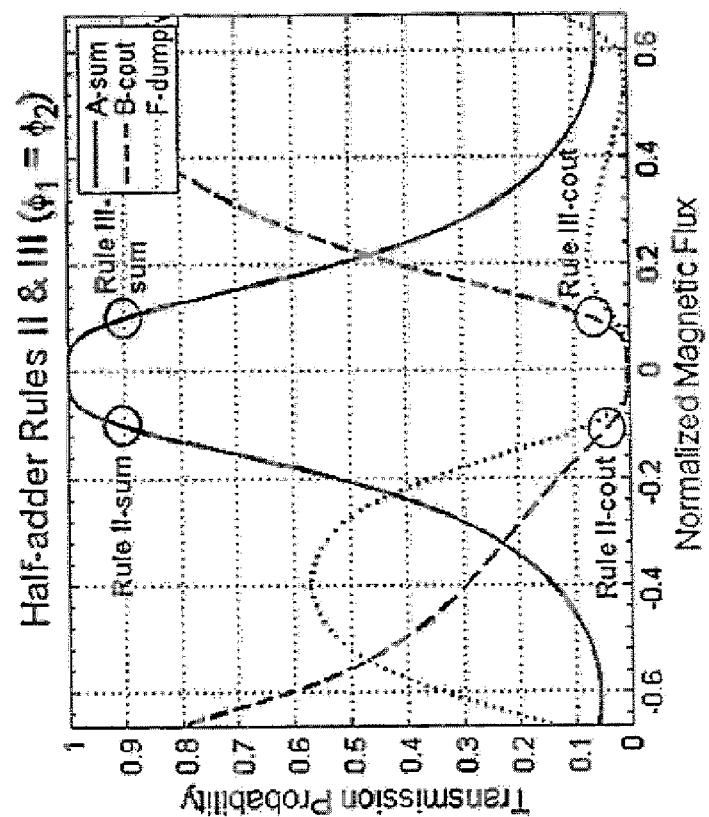

FIGS. 12A-B are a collection of two graphs A and B respectively showing the transmission results for a M4D ABF configuration for use as a half-adder.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. A nigh-infinite number of other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A method of performing digital operations comprising:
   transforming at least one digital input into a signal;
   using the signal to excite an irreducibly-coupled Aharonov-Bohm (AB) ring network, wherein the Aharonov-Bohm (AB) ring network is configured with three terminals;
   reading a state of the irreducibly-coupled Aharonov-Bohm (AB) ring network, the state read by evaluating what portion of a transmission probability can be measured on one or more of the three terminals.

2. The method of claim 1 wherein the signal is a magnetic flux.

3. The method of claim 1 wherein the signal is an electric current.

4. The method of claim 1 further comprising transforming a result of reading the state into an array of bits.

5. The method of claim 1 further comprising:
   transforming a result of reading the state into a second signal;
   using the second signal to excite an irreducibly-coupled second AB ring network, wherein the second AB ring network is configured with three terminals;
   reading a state of the second AB ring network, the state read by evaluating what portion of a transmission probability can be measured on one or more of the three terminals.

6. The method of claim 5, wherein the second AB ring network is the AB ring network.

7. A system of performing digital operations comprising:
   a first device configured to transform a digital input into one or more signals;
   at least one Aharonov-Bohm (AB) ring, the at least one Aharonov-Bohm (AB) ring irreducibly-coupled and configured to include at least three terminals;
   a second device configured to read a portion of a signal expressed upon two or more of the at least three terminals;
   a third device configured to transform the portion of the signal expressed upon two or more of the at least three terminals into a digital output, the third device operationally connected to the second device.

8. The system of claim 7, wherein the at least one AB ring is excited by the one or more signals as expressed by the first device.

9. An apparatus for performing digital operations comprising:
   at least one electron waveguide, defining an irreducibly-coupled Aharonov-Bohm (AB) ring network and the at least one electron waveguide operationally connected to at least three terminals;
   a modulator operationally connected to the at least one electron waveguide;
   an electron wave transmission detector operationally connected to the at least one electron waveguide for detecting a portion of an electron wave transmission expressed upon two or more of the at least three terminals;
   a signal-to-digital converter operationally connected to the electron wave transmission detector and configured to express the portion of an electron wave transmission expressed upon two or more of the at least three as a digital output.

10. The apparatus of claim 9, wherein the at least one electron waveguide is composed of a superconducting material and sufficiently cooled such that the at least one electron waveguide is in a superconducting state.

11. A device, comprising:
a first irreducibly coupled Aharonov-Bohm (AB) ring having at least three terminals; and a second irreducibly coupled Aharonov-Bohm (AB) ring having at least three terminals; wherein the second irreducibly coupled AB ring is operationally connected to the first irreducibly coupled Aharonov-Bohm (AB) ring.

12. The device of claim 11 wherein the respective first and second irreducibly coupled AB rings are operationally connected in an even-even configuration.

13. The device of claim 11 wherein the respective first and second irreducibly coupled AB rings are operationally connected in an odd-odd configuration.

14. The device of claim 11 wherein the respective first and second irreducibly coupled AB rings are operationally connected in an even-odd configuration.

15. The device of claim 11 wherein the respective first and second irreducibly coupled AB rings each define three gold atoms and wherein two respective gold atoms participate in both the first and the second irreducibly coupled AB rings.

16. The device of claim 11 wherein the respective first and second irreducibly coupled AB rings each define four metal atoms and wherein two respective metal atoms participate in both the first and the second irreducibly coupled AB rings.

* * * * *